(12) United States Patent
Dag et al.

(10) Patent No.: US 11,321,705 B2
(45) Date of Patent: May 3, 2022

(54) COMBINATION MOBILE PHONE CASE AND PAYMENT CARD ASSEMBLY FOR FACILITATING DIGITAL WALLET PAYMENTS

(71) Applicant: Mastercard International Incorporated, Purchase, NY (US)

(72) Inventors: Jonathan Dag, Weston, FL (US); Daniel Acosta, Key Biscayne, FL (US); Walter Pimenta, Miami, FL (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/749,064

(22) Filed: Jan. 22, 2020

(65) Prior Publication Data
US 2021/0224787 A1 Jul. 22, 2021

(51) Int. Cl.
*G06Q 20/00* (2012.01)
*G06Q 20/34* (2012.01)
*G06Q 20/22* (2012.01)
*H04M 1/7246* (2021.01)

(52) U.S. Cl.
CPC ......... *G06Q 20/353* (2013.01); *G06Q 20/227* (2013.01); *G06Q 20/341* (2013.01); *H04M 1/7246* (2021.01)

(58) Field of Classification Search
CPC .. G06Q 20/353; G06Q 20/341; G06Q 20/227; G06Q 30/016; G06Q 20/3278; G06Q 20/3227; H04M 1/72575; H04M 1/7253; H04M 2250/14; G06F 21/44; G06K 19/07749; G06K 7/0086
USPC ................................ 235/375; 455/558, 41.1
See application file for complete search history.

(56) References Cited

U.S. PATENT DOCUMENTS

| | | | |
|---|---|---|---|
| 6,412,627 B1 | 7/2002 | Tiscione et al. | |
| D626,119 S | 10/2010 | Fellig | |
| 9,339,094 B2 | 5/2016 | Tucker-Skow et al. | |
| 2010/0274677 A1* | 10/2010 | Florek | G06Q 20/363 705/16 |
| 2012/0244918 A1 | 9/2012 | Hall | |
| 2013/0146661 A1* | 6/2013 | Melbrod | H04M 1/04 235/435 |
| 2014/0332441 A1* | 11/2014 | Jayetileke | H04B 1/3888 206/774 |
| 2017/0026070 A1 | 1/2017 | Hodroj | |
| 2017/0026498 A1* | 1/2017 | Goldfain | H04M 1/185 |

* cited by examiner

*Primary Examiner* — Jamara A Franklin
(74) *Attorney, Agent, or Firm* — Buckley, Maschoff & Talwalkar LLC

(57) ABSTRACT

A mobile telephone case includes a case body that defines a pocket for holding a mobile telephone. A card holder module is attached to the case body. The card holder module includes a hollow card holder body. An IC payment card is slidably mounted within the card holder body. When by sliding motion the IC payment card is moved to an actuated position, a set of contact pads on the card is exposed to allow the IC payment card to engage in a contact card payment account transaction.

18 Claims, 31 Drawing Sheets

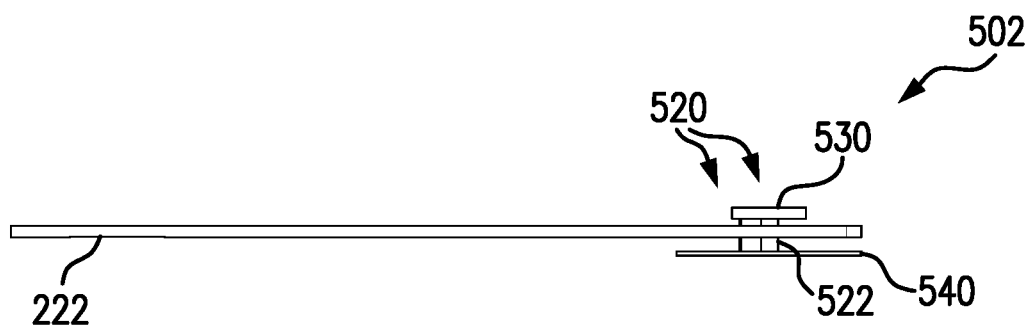
FIG. 35
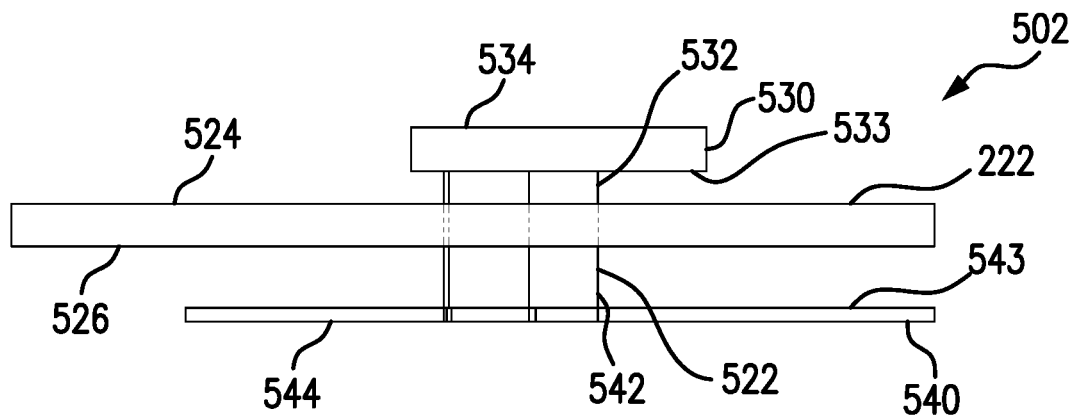
FIG. 36
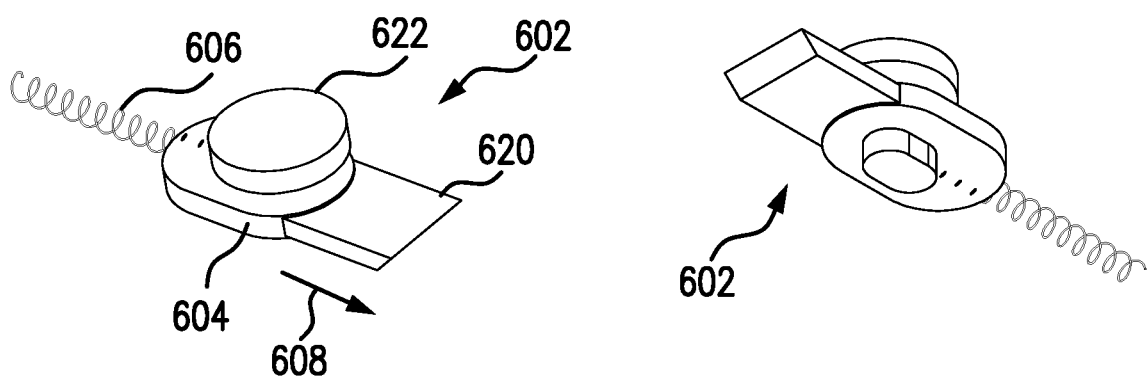
FIG. 37
FIG. 38

COMBINATION MOBILE PHONE CASE AND PAYMENT CARD ASSEMBLY FOR FACILITATING DIGITAL WALLET PAYMENTS

BACKGROUND

FIG. 1 is a block diagram that illustrates a conventional payment card account system 100.

The system 100 includes a customer device 102 such as a magnetic stripe card, a payment IC (integrated circuit) card (contactless and/or contact), or a payment-enabled mobile device. Block 104 in FIG. 1 represents a merchant device such as a POS (point of sale) terminal/card reader. The merchant device 104 may also be considered part of the payment card account system 100. The customer device 102 may be presented to the merchant device 104, to consummate a purchase transaction and to permit the merchant device 104 to read payment card account data (including, e.g., a payment account number or payment token) from the customer device 102.

A computer 106 operated by an acquirer (acquiring financial institution) is also shown as part of the system 100 in FIG. 1. The acquirer computer 106 may receive a payment account system authorization request message for the transaction from the merchant device 104. The acquirer computer 106 may route the authorization request message via a card network 108 (also referred to as a "payment network") to a server computer 110 operated by the issuer (also referred to as the "issuer bank") of a payment account that is associated with the account number obtained by the merchant device 104 (e.g., from the customer device 102) and included in the authorization request message. The authorization response message generated by the payment account issuer server computer 110 may be routed back to the merchant device 104 via the card network 108 and the acquirer computer 106.

One well known example of a card network is the network operated by Mastercard International Incorporated, which is the assignee hereof.

The payment account issuer server computer 110 may be operated by or on behalf of a financial institution ("FI") that issues payment accounts to individual users such as the customer who presented or operated the customer device 102 referred to above. For example, the payment card issuer server computer 110 may perform such functions as (a) receiving and responding to requests for authorization of payment account transactions to be charged to payment accounts issued by the FI; and (b) tracking and storing transactions and maintaining account records.

The components of the system 100 as depicted in FIG. 1 are only those that are needed for processing a single transaction. A typical payment system may process many purchase transactions (including simultaneous transactions) and may include a considerable number of payment account issuers and their computers, a considerable number of acquirers and their computers, and numerous merchants and their devices, as well as a very large number of customer devices.

Many holders of payment accounts are embracing the use of payment-enabled mobile devices in lieu of using a payment card at the point of sale. Such users may find it convenient to carry their smartphone without also carrying a wallet or pocketbook, and increasingly users are free to "travel light" in this manner, because at many points of sale the merchant device has been adapted to read payment-enabled mobile devices in order to obtain payment credential information therefrom.

Another advantage offered by many payment-enabled enabled smartphones or similar devices is that the device may run a so-called "wallet app" that allows the user to manage and select among two or more payment accounts for which the credentials have been provisioned to the payment-enabled smartphone. This provides functionality that is not available via a payment card alone. In short, the technology that supports payment-enablement for smartphones also supports using the smartphone as a "digital wallet."

Nevertheless, there remain obstacles and difficult situations that may be encountered in the "travel light" approach, where a payment-enabled smartphone is not all the user needs to perform desired financial transactions. For example, some point of sale devices that readily accept payment cards (e.g., most gasoline pumps) do not yet generally support payment-enabled smartphone transactions. Moreover, sometimes the transaction entails handing over the payment device to the merchant's employee, as in the case of settling a check at a restaurant. A user may find it undesirable, or even ineffective, to hand over a payment-enabled smartphone in the restaurant situation.

BRIEF DESCRIPTION OF THE DRAWINGS

Features and advantages of some embodiments of the present disclosure, and the manner in which the same are accomplished, will become more readily apparent upon consideration of the following detailed description of the invention taken in conjunction with the accompanying drawings, which illustrate preferred and example embodiments, and which are not necessarily drawn to scale, wherein:

FIG. 35 is a side view of the payment card module.

FIG. 36 is a partially transparent side view, showing some details of the payment card module as seen in FIG. 35.

FIG. 37 is an isometric view, taken from above, of a card-locking mechanism that is included in the mobile telephone case assembly of FIGS. 3-15.

FIG. 38 is an isometric view, taken from below, of the card-locking mechanism of FIG. 37.

DESCRIPTION

In general, and for the purpose of introducing concepts of embodiments of the present disclosure, a mobile phone case also stores a payment card. The card is permanently secured in a detachable portion of the phone case. The card is mounted in a sliding manner in the detachable portion. The card may be caused to slide relative to the detachable portion so that a magnetic stripe and contact pads are exposed. The card may be exposed by the sliding operation whether or not the detachable portion is attached to the phone case.

Wiring on the phone case allows a smartphone held in the phone case to detect when the sliding operation of the card occurs, and also to detect when the detachable portion of the phone case is detached. Upon detecting one of these events, the smartphone prompts the user to select an account to be charged in a transaction that the card is or is about to be engaged in. The smartphone communicates the account selection information to a remote payment services computer, thereby controlling detokenization of the card transaction.

Figure 2:
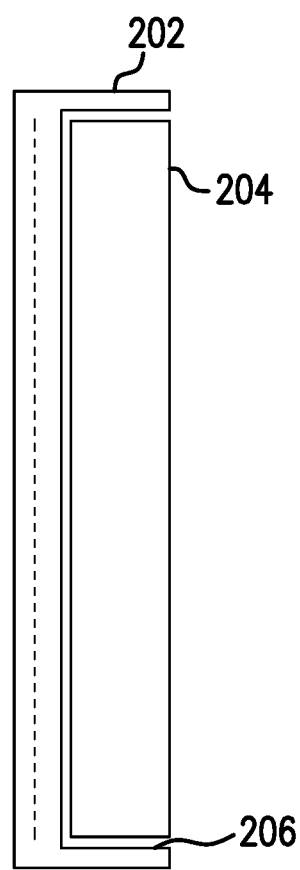
FIG. 2 is a schematic side cross-sectional view of a mobile telephone case assembly holding a mobile telephone, the mobile telephone case assembly being provided according to aspects of the present disclosure.

FIG. 2 is a schematic side cross-sectional view of a mobile telephone case assembly 202 holding a mobile telephone 204, the mobile telephone case assembly 202 being provided according to aspects of the present disclosure. A pocket 206, formed in the mobile telephone case assembly 202, holds the mobile telephone 204 in such a manner as to afford protection to the mobile telephone 204 from damage arising from handling or mishandling of the mobile telephone 204/mobile telephone case assembly 202. It will be appreciated that the pocket is shaped and sized to hold the mobile telephone 204 securely, as is usually the situation with a mobile phone case.

The mobile telephone case assembly 202 is shown without the mobile telephone 204 is various views in FIGS. 3-11, such views having been enumerated in a prior section of this disclosure. The pocket 206 is best seen, for example, in FIGS. 3 and 4.

A detachable portion 210 of the mobile telephone case assembly 202 is visible, for example, in FIGS. 7-11. The detachable portion 210 is at an opposite side of the mobile telephone case assembly 202 from the pocket 206. Thus, when the mobile telephone 204 (FIG. 2, not shown in FIGS. 3-11) is present in the pocket 206, the detachable portion 210 is behind the mobile telephone 204 (assuming the detachable portion has not been detached). As will be understood from subsequent discussion and other drawings, the detachable portion 210 has a payment card (not visible in FIGS. 2-11) permanently installed therewithin. A portion of a sliding arrangement for the payment card is visible at 212 in FIGS. 9-11. A portion of a locking mechanism for the detachable portion 210 is visible at 214 in FIGS. 9-11.

Figure 10:
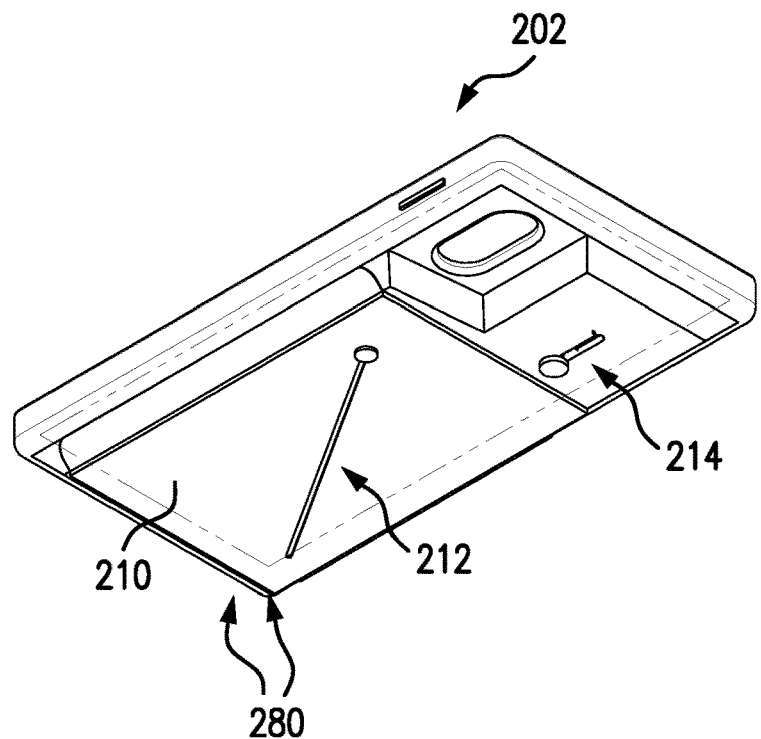
FIG. 10 is an isometric view of the mobile telephone case assembly taken from below.
Figure 11:
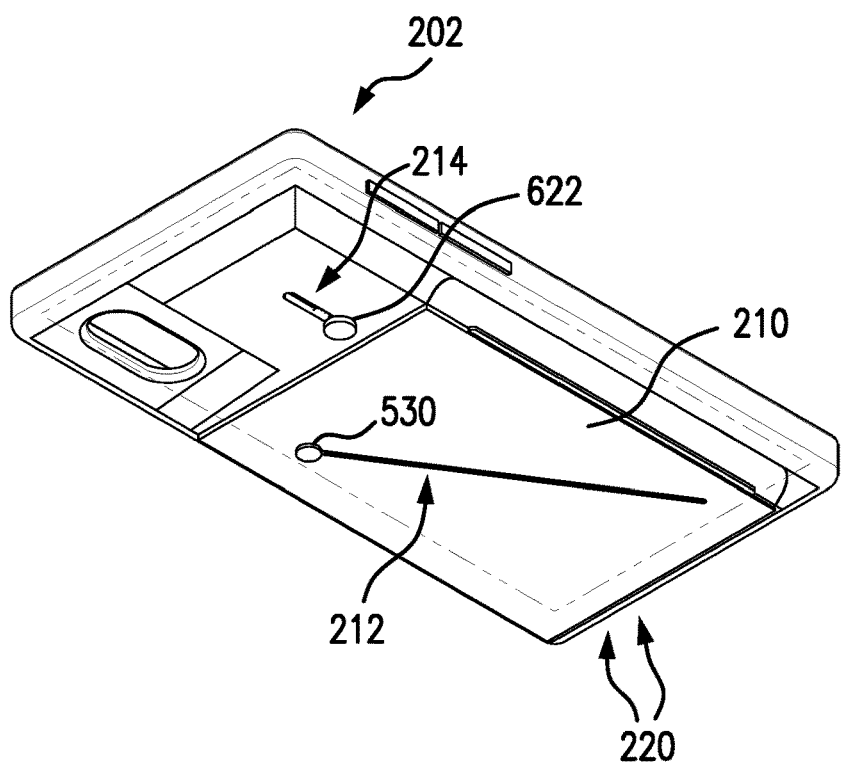
FIG. 11 is another isometric view of the mobile telephone case assembly, this view also being taken from below, but at a different angle relative to FIG. 10.
Figure 12:
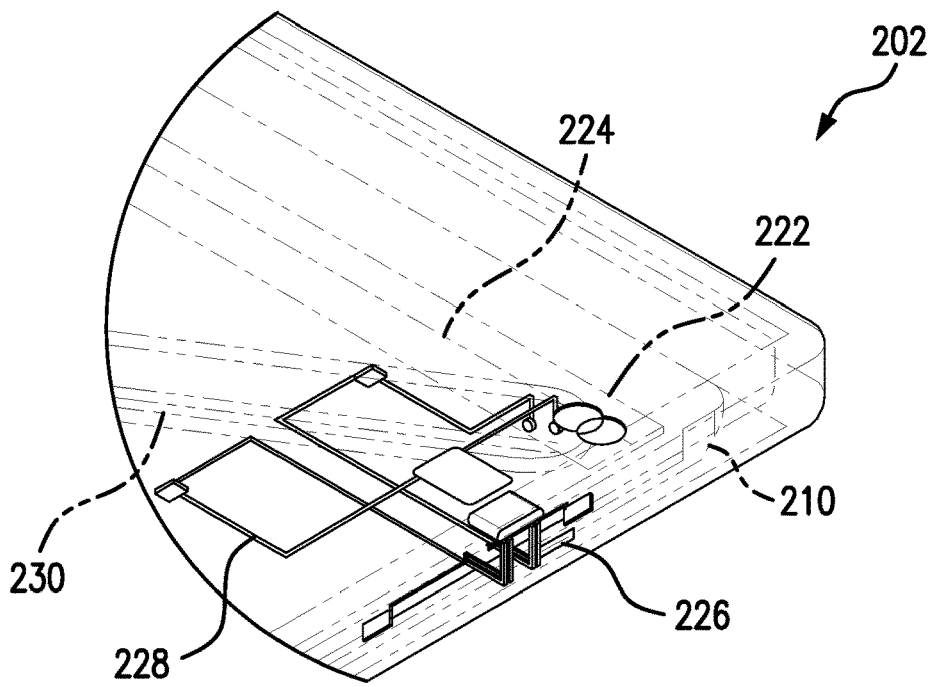
FIG. 12 is a partially transparent isometric view, showing some details of the mobile telephone case assembly, as seen in FIG. 11.

FIG. 12 is a partially transparent isometric view, showing some details of the mobile telephone case assembly 202, in the portion of FIG. 10 indicated by reference numeral 220. Referring to FIG. 12, the payment card referred to above (as being installed in the detachable portion 210) is indicated by reference numeral 222. (Only a corner of the payment card 222 is seen in FIG. 12. A portion of the magnetic stripe 224 of the payment card 222 is also visible in FIG. 12. Also seen (represented schematically) is the conductive contact set 226 by which the payment card 222 (when exposed, as discussed herein) may engage in contact payment card account transactions. Some wiring for monitoring the card status is indicated by reference numeral 228. A sliding track for the payment card 222 is schematically indicated at 230.

It will be appreciated that, like a typical contact payment card, the payment card 222 is an IC payment card, incorporating an IC (integrated circuit—not shown) coupled to the conductive contact set 226.

Figure 3:
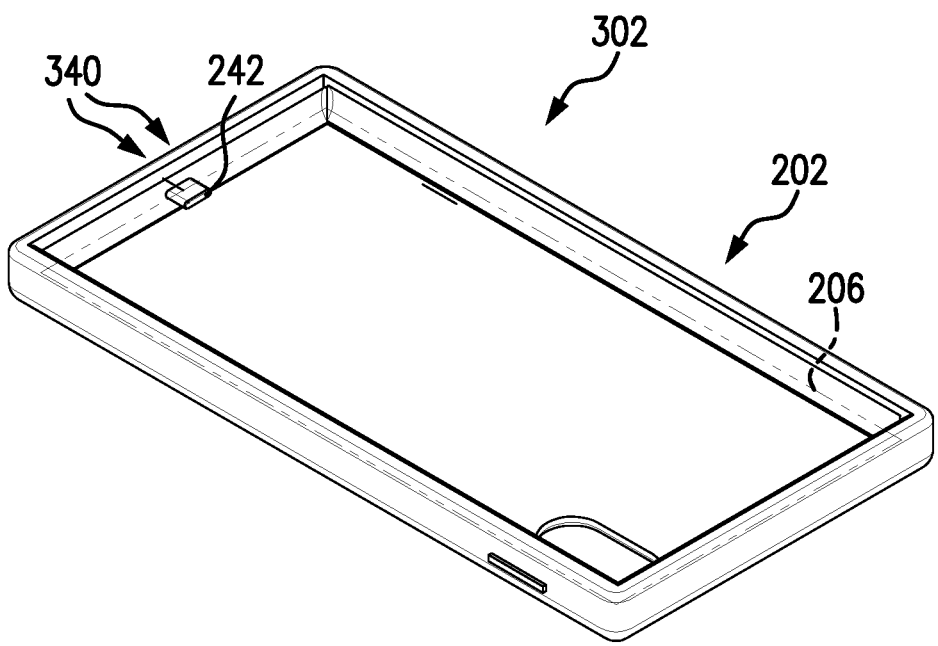
FIG. 3 is an isometric view of the mobile telephone case assembly taken from above.
Figure 4:
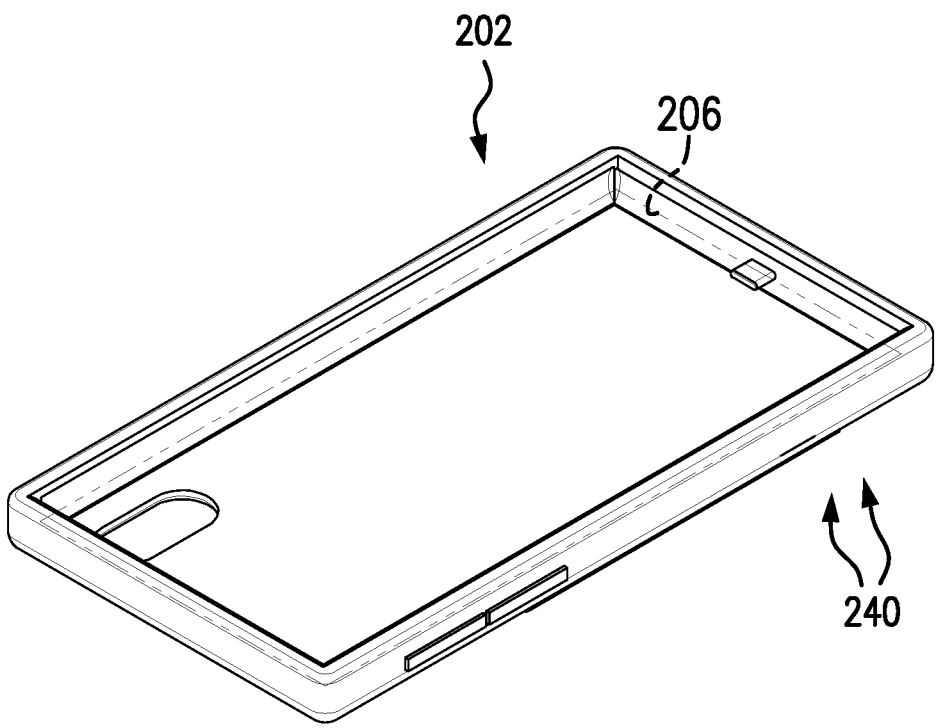
FIG. 4 is another isometric view of the mobile telephone case assembly, this view also being taken from above, but at a different angle relative to FIG. 3.
Figure 5:
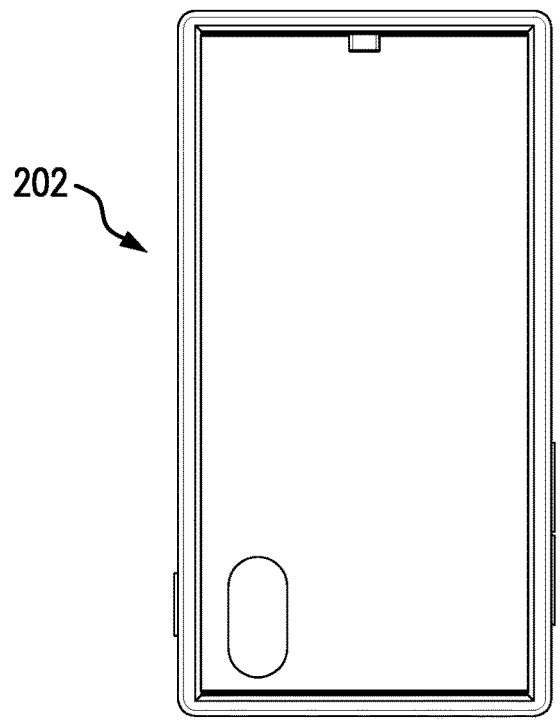
FIG. 5 is a front elevational view of the mobile telephone case assembly.
Figure 6:
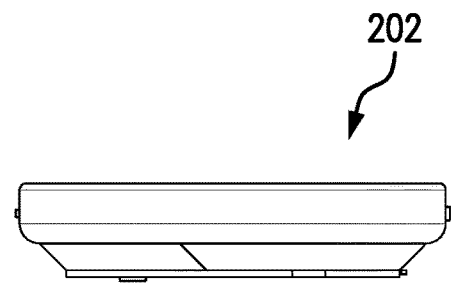
FIG. 6 is a view from directly above the mobile telephone case assembly.
Figure 7:
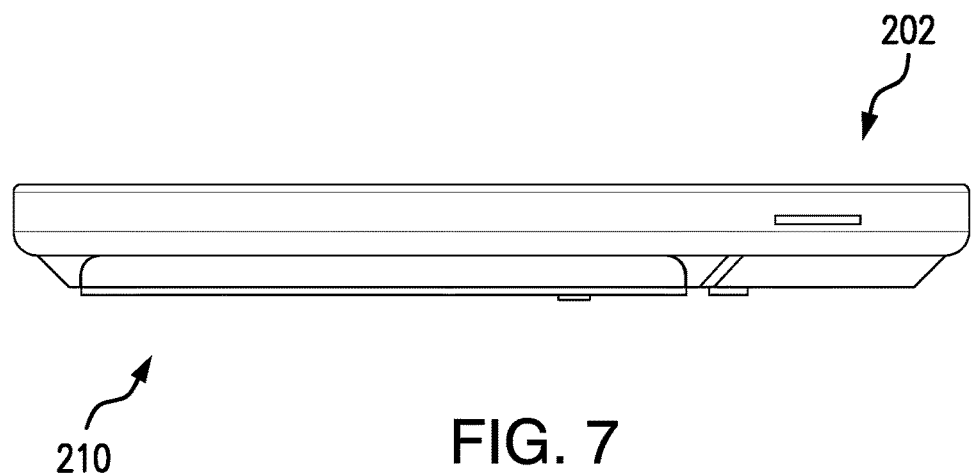
FIG. 7 is a left side elevational view of the mobile telephone case assembly.
Figure 13:
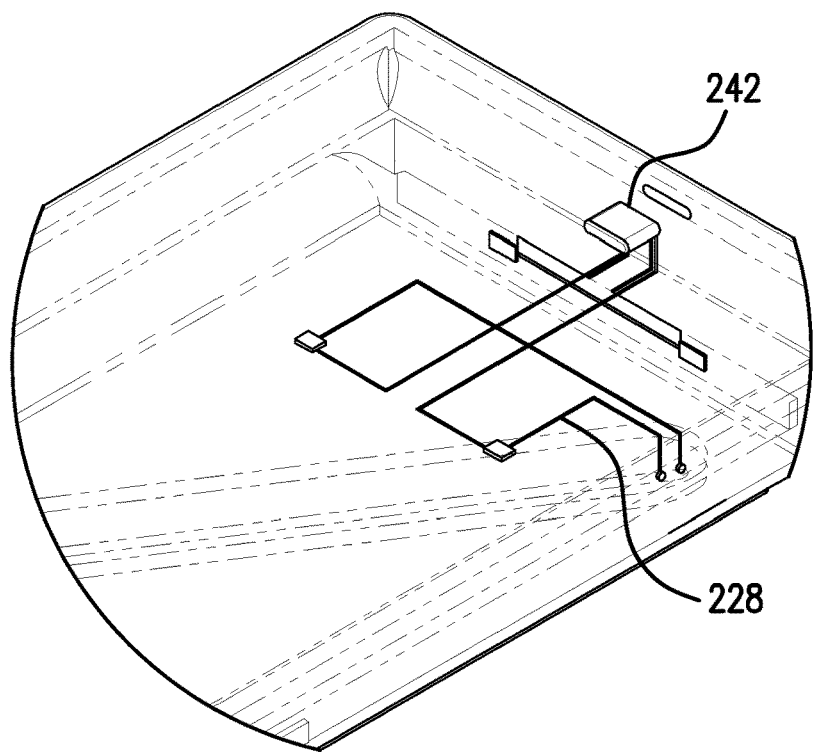
FIG. 13 is a partially transparent isometric view, showing some details of the mobile telephone case assembly, as seen in FIG. 4.

FIG. 13 is a partially transparent isometric view, showing some details of the mobile telephone case assembly 202, in a portion of FIG. 4 indicated by reference numeral 240. Again wiring 228 is seen in FIG. 13, along with a plug 242 positioned for insertion in a port (not shown in FIG. 13) of the mobile telephone 204 (not shown in FIG. 13) when the mobile telephone 204 is present in the pocket 206 (FIG. 3.)

Figure 8:
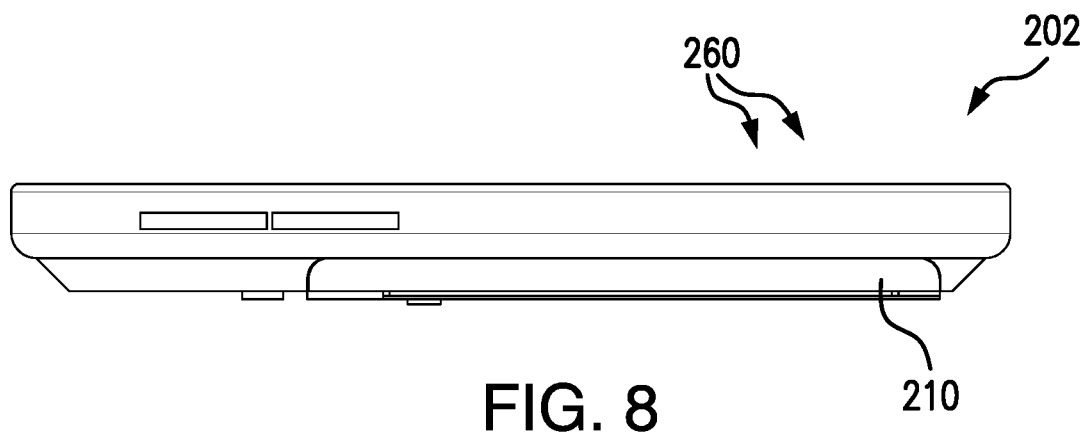
FIG. 8 is a right-side elevational view of the mobile telephone case assembly.
Figure 9:
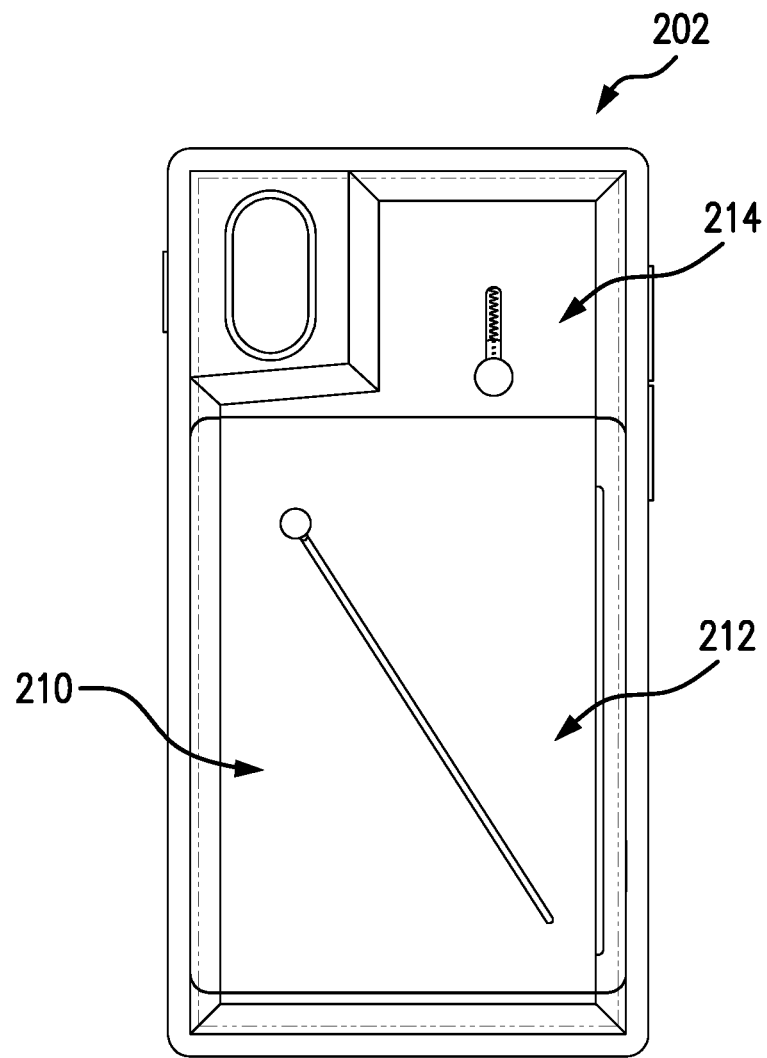
FIG. 9 is a rear elevational view of the mobile telephone case assembly.
Figure 14:
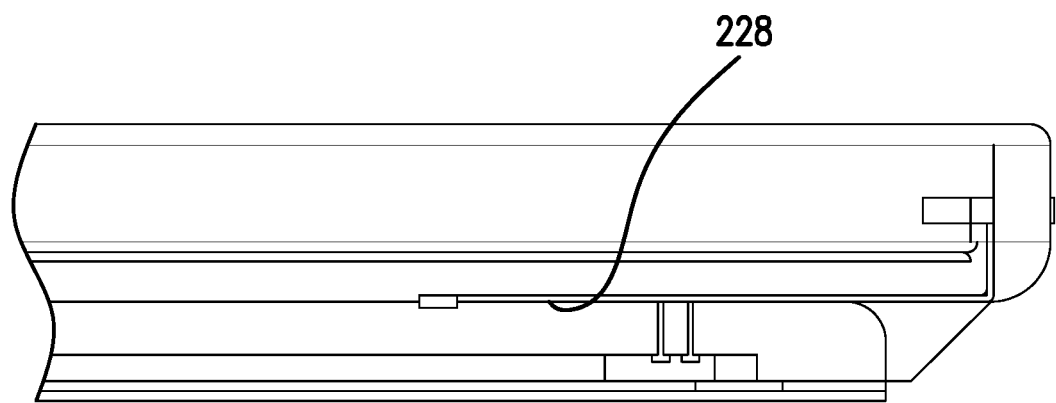
FIG. 14 is a partially transparent isometric view, showing some details of the mobile telephone case assembly, as seen in FIG. 8.

FIG. 14 is a partially transparent side view, showing some details of the mobile telephone case assembly 202, in a portion of FIG. 8 indicated by reference numeral 260. In particular, FIG. 14 shows another view of wiring 228 shown in FIGS. 12 and 13.

Figure 15:
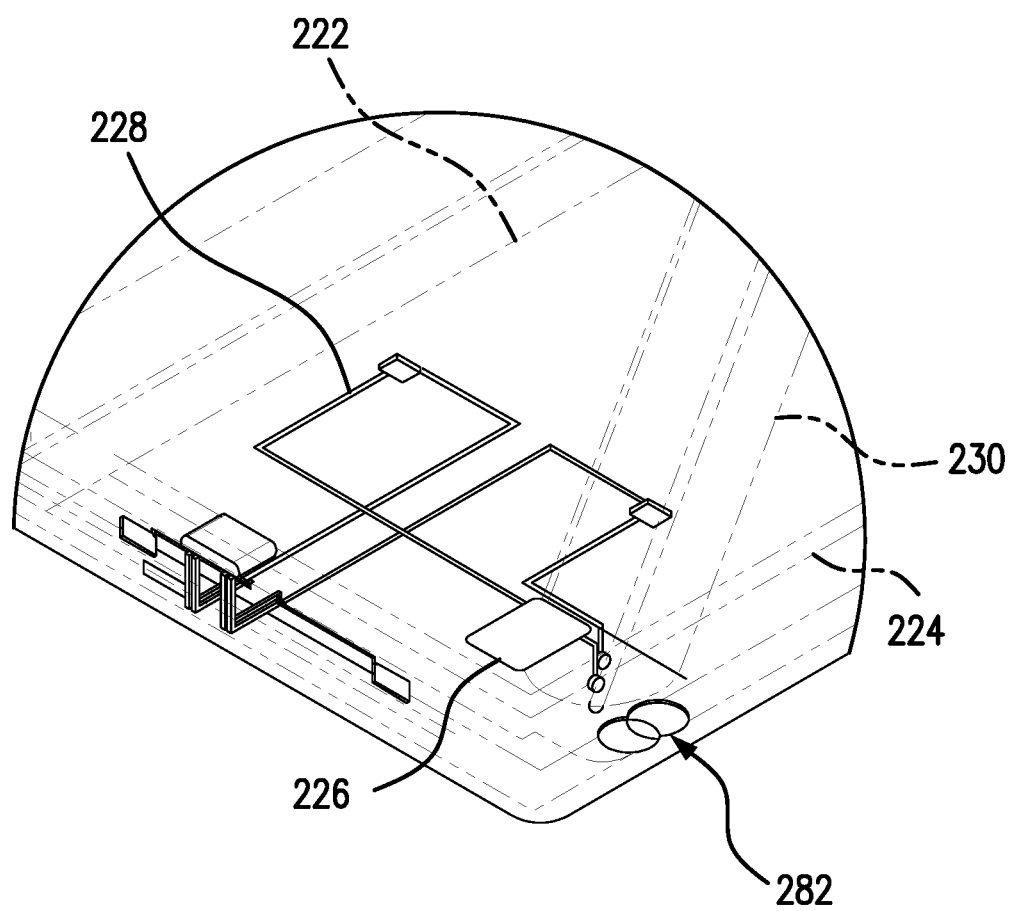
FIG. 15 is a partially transparent isometric view, showing some details of the mobile telephone case assembly, as seen in FIG. 10.

FIG. 15 is a partially transparent isometric view, showing some details of the mobile telephone case assembly 202, in the portion of FIG. 10 indicated by reference numeral 280. In FIG. 15, again a portion of the payment card 222 is visible, along with the magnetic stripe 224 of the payment card 222 and the conductive contact set 226 (again shown schematically). Also visible is a payment system logo 282. The wiring 228 is also visible, as is the schematically indicated sliding track 230 for the payment card 222.

Figure 16:
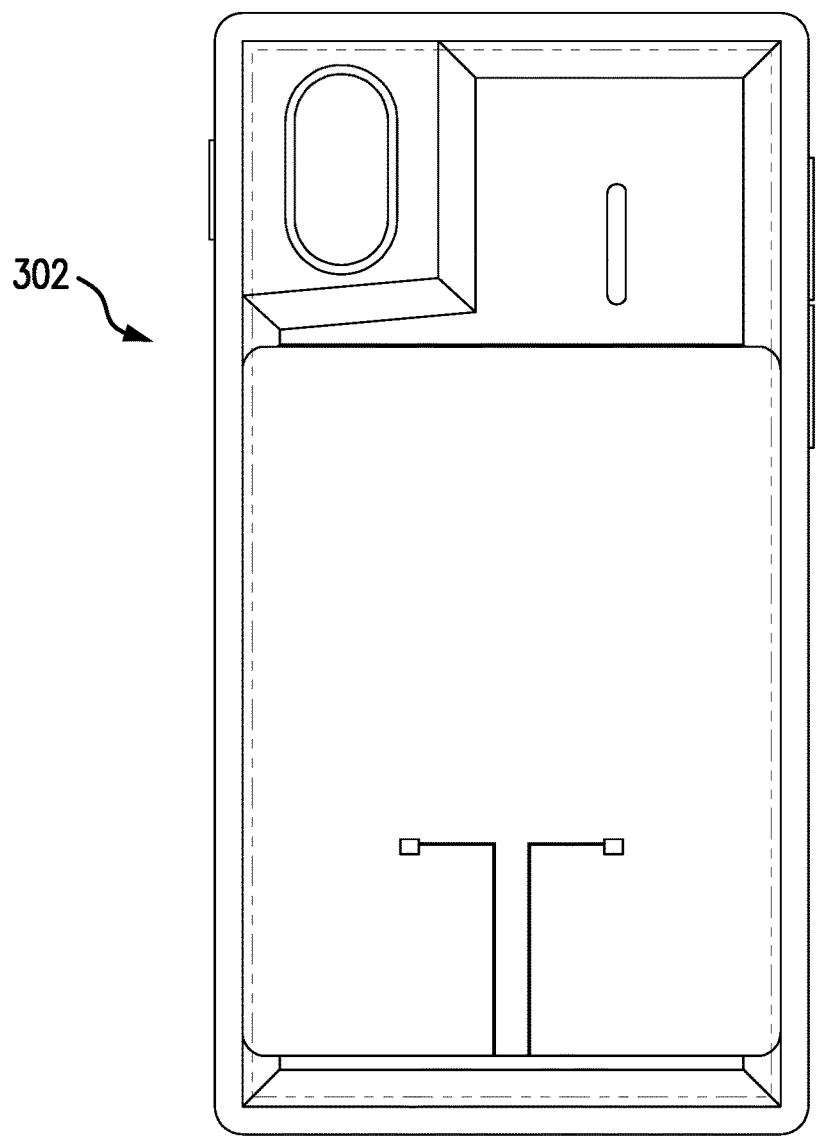
FIG. 16 is a rear elevational view of a telephone case body that is part of the mobile telephone case assembly of FIGS. 3-15.
Figure 17:
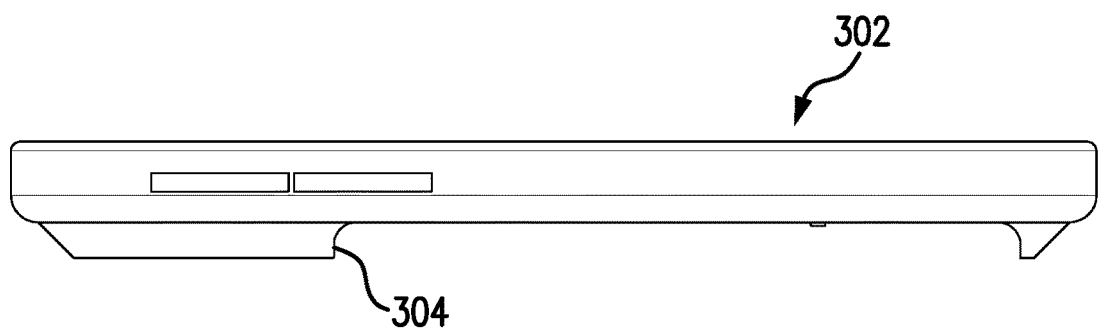
FIG. 17. is a right side elevational view of the telephone case body of FIG. 16.

FIG. 16 is a rear elevational view of a telephone case body 302 that is a major part of the mobile telephone case assembly 202. The telephone case body 302 is shown in FIG. 16, and also in FIGS. 17 and 18, with the detachable portion 210 having been removed (i.e., the detachable portion 210 is not present in FIGS. 16-18). As best seen in FIG. 17, the telephone case body 302 features a receptacle 304 into which the detachable portion 210 (not shown in FIG. 17) may be installed when the mobile telephone case assembly 202 is fully assembled.

Figure 18:
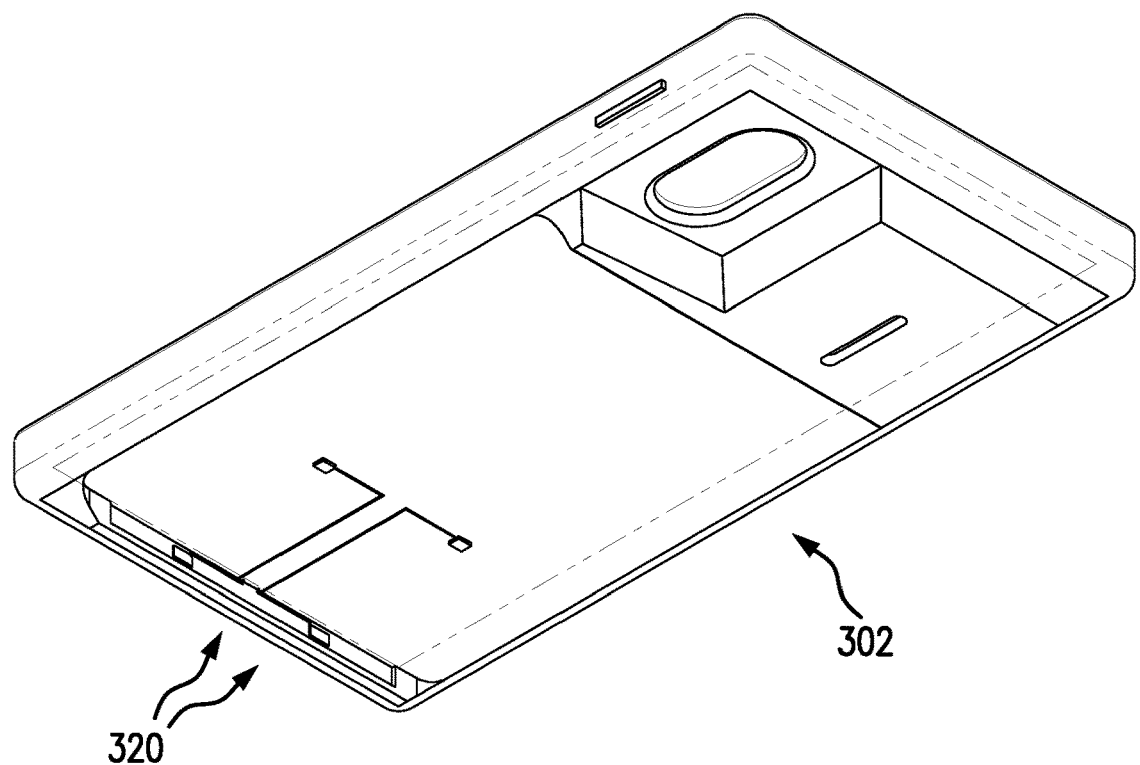
FIG. 18 is an isometric view of the telephone case body, taken from below.
Figure 19:
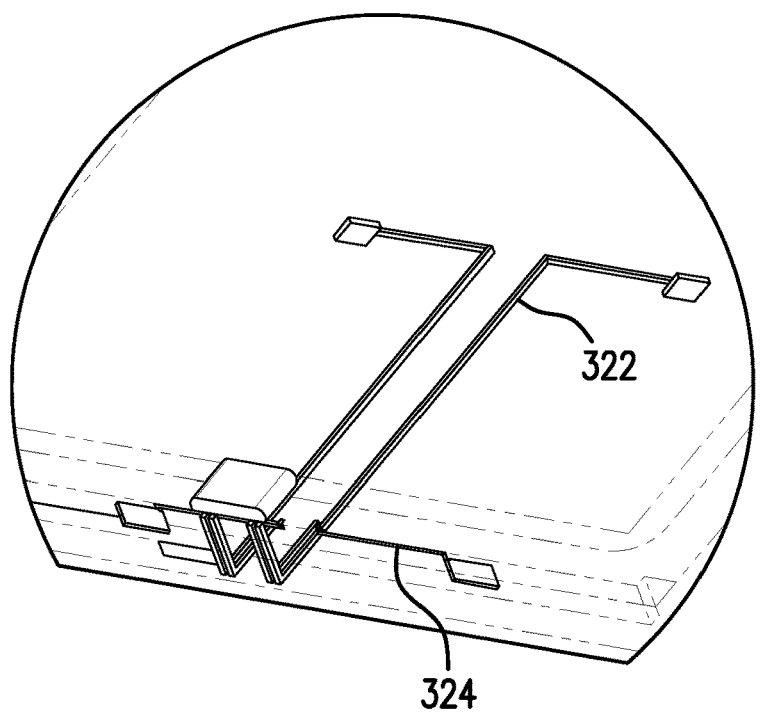
FIG. 19 is a partially transparent isometric view, showing some details of the telephone case body, as seen in FIG. 18.

FIG. 19 is a partially transparent isometric view, showing some details of the telephone case body 302, in the portion of FIG. 18 indicated by reference numeral 320. FIG. 19 shows wiring 322 for monitoring sliding of the payment card 222 (not shown in FIG. 19) and wiring 324 for monitoring detachment of the detachable portion 210 (not shown in FIG. 19).

Figure 20:
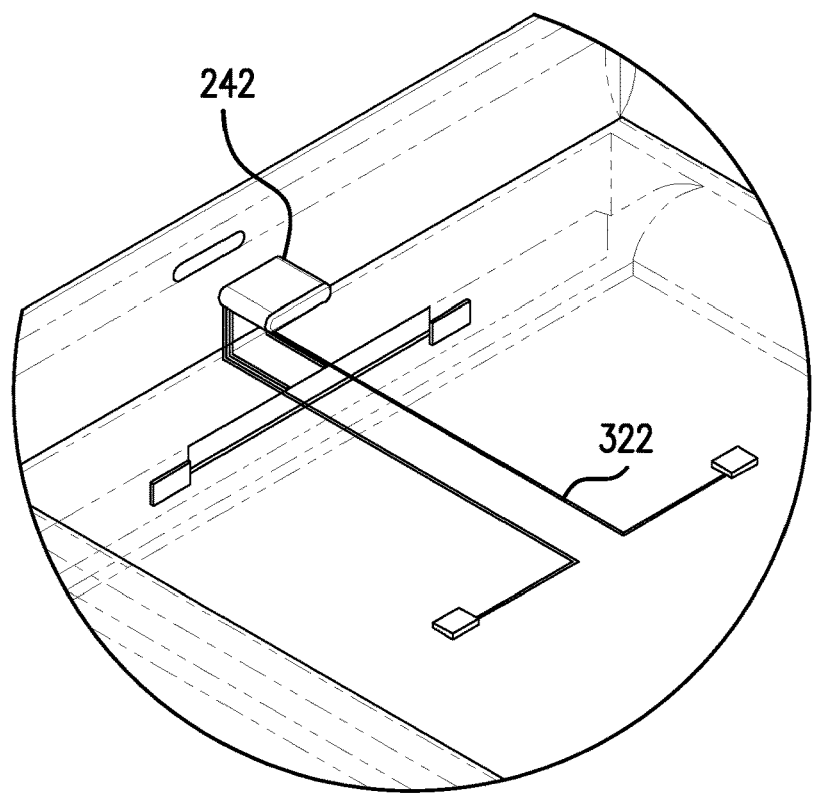
FIG. 20 is a partially transparent isometric view, showing some details of the telephone case body, as visible in FIG. 3.

FIG. 20 is a partially transparent isometric view, showing some details of the telephone case body 302, in the portion of FIG. 3 indicated by reference numeral 340. The wiring 322 and the plug 242 (also seen in FIG. 13).

Figure 21:
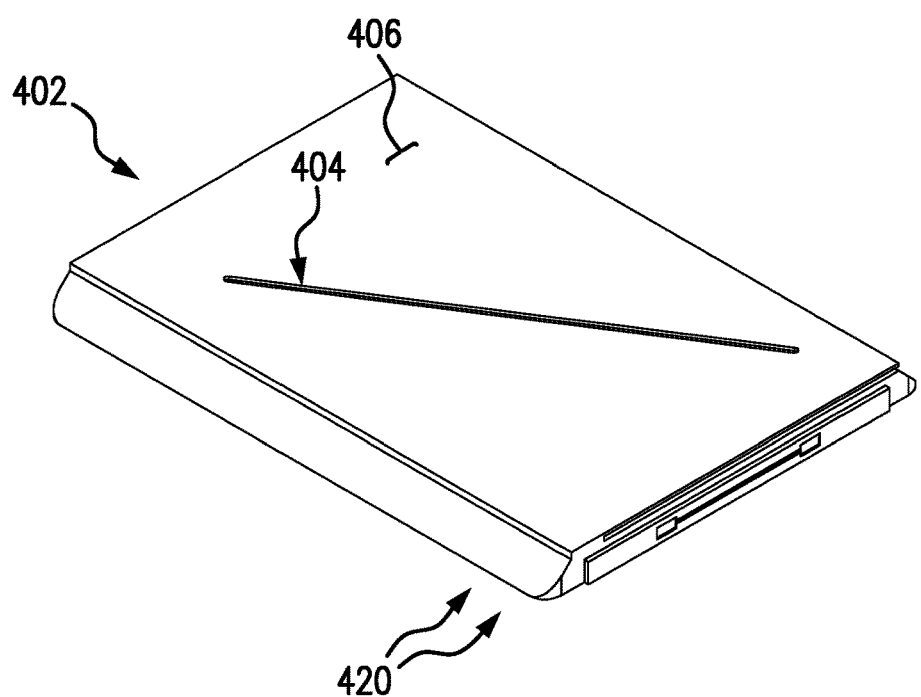
FIG. 21 is an isometric view, taken from above, of a card holder body that is part of the mobile telephone case assembly of FIGS. 3-15.

FIG. 21 is an isometric view, taken from above, of a card holder body 402 that is a major component of the detachable portion 210 of the mobile telephone case assembly 202.

Figure 22:
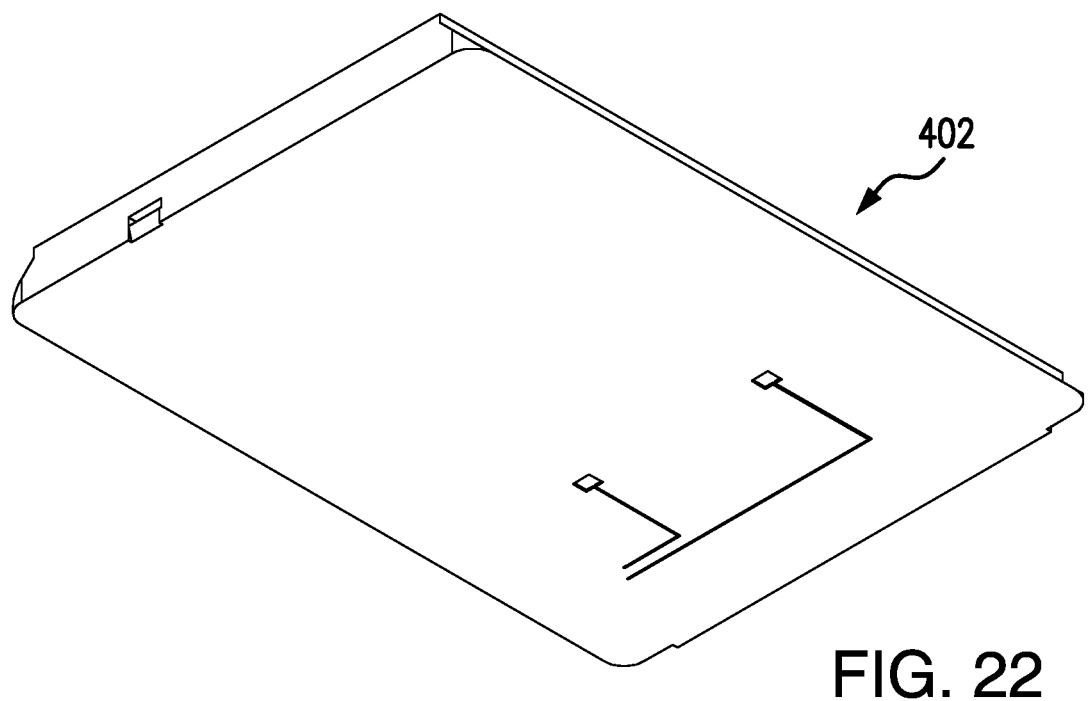
FIG. 22 is an isometric view, taken from below, of the card holder body of FIG. 21.
Figure 23:
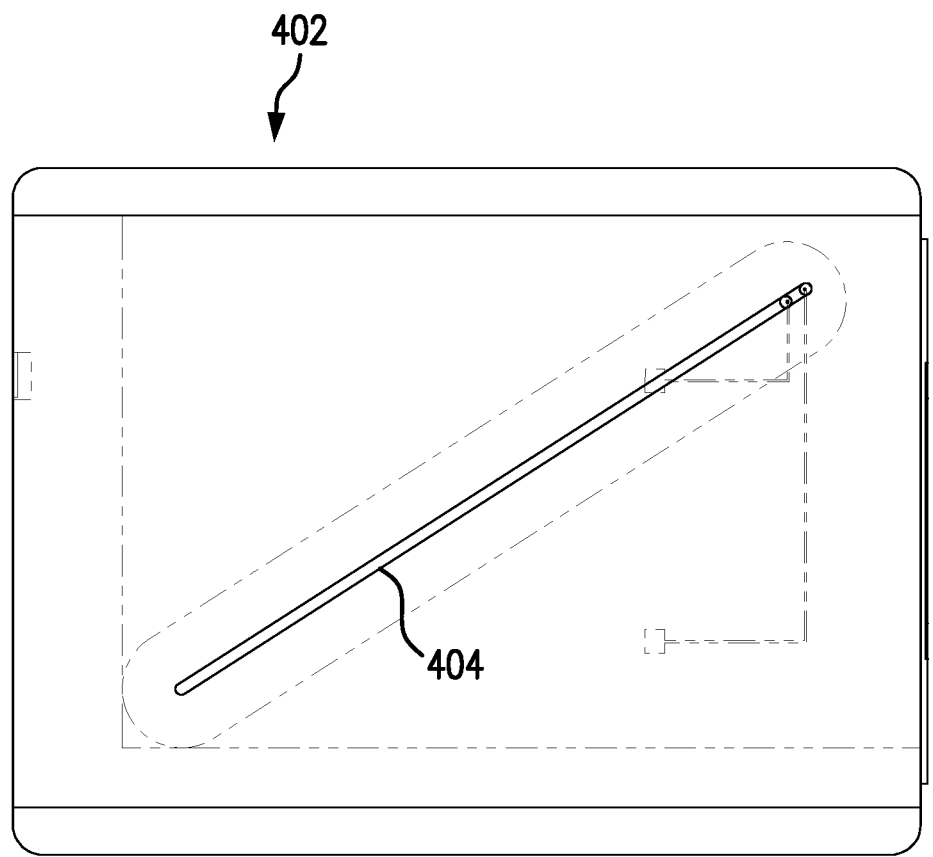
FIG. 23 is a plan view of the card holder body.

FIG. 22 is another isometric view of the card holder body 402, taken from below.

FIGS. 23-27 are further views of the card holder body 402, as enumerated in an earlier section of this disclosure.

The card holder body 402 is substantially hollow, to accommodate mounting therewithin of the payment card 222 (not explicitly shown in FIGS. 21-27). A slot 404 (best seen in FIG. 21) is formed in the top wall 406 of the card holder body 402. The slot 404 is for accommodating and guiding sliding motion of the payment card 222 as discussed in more detail below. The slot 404 is seen to extend diagonally relative to the generally rectangular profile of the card holder body 402 in the plane of the payment card 222. The rectangular profile of course includes two parallel long sides and two short sides that are parallel to each other and perpendicular to the long sides.

Figure 24:
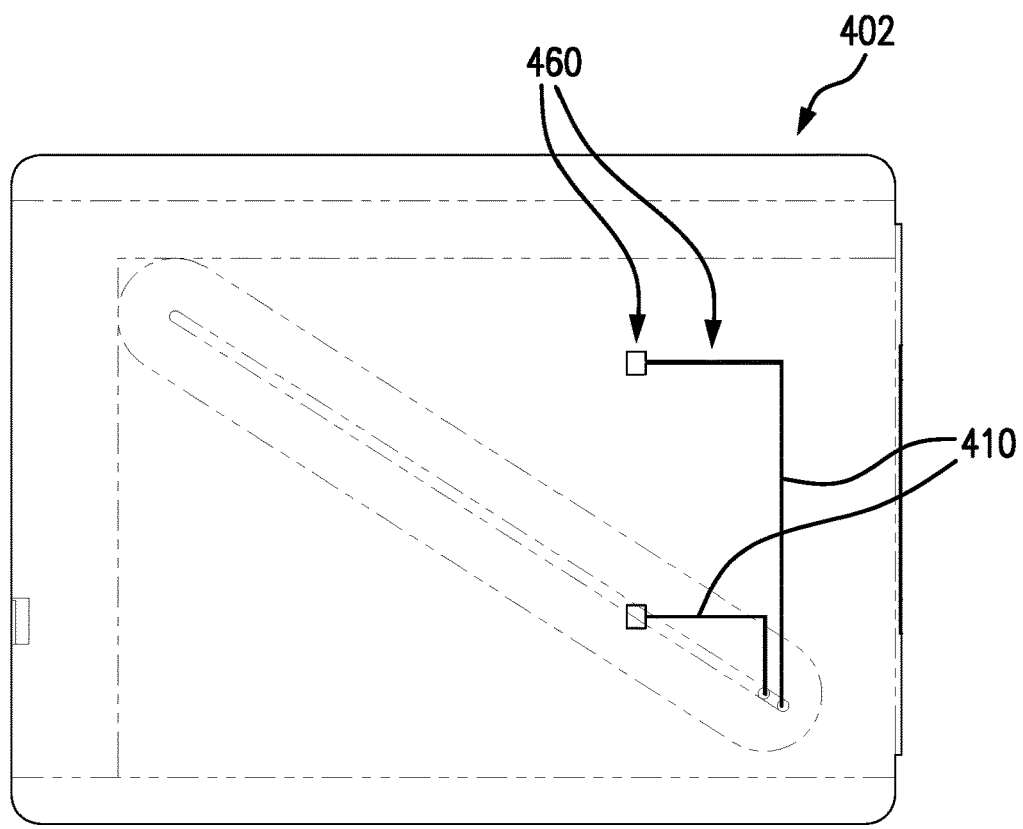
FIG. 24 is a bottom plan view of the card holder body.
Figure 25:
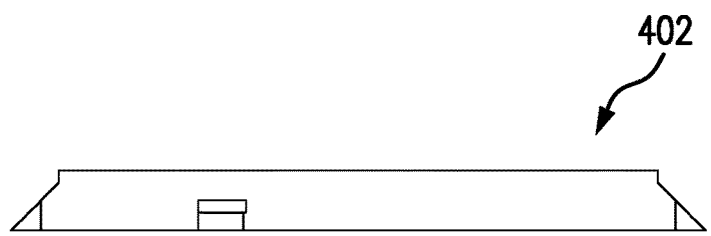
FIGS. 25 and 26 are respective end views of the card holder body.

FIG. 24 shows wiring 410 that is used for monitoring sliding operation of the payment card 222.

Figure 28:
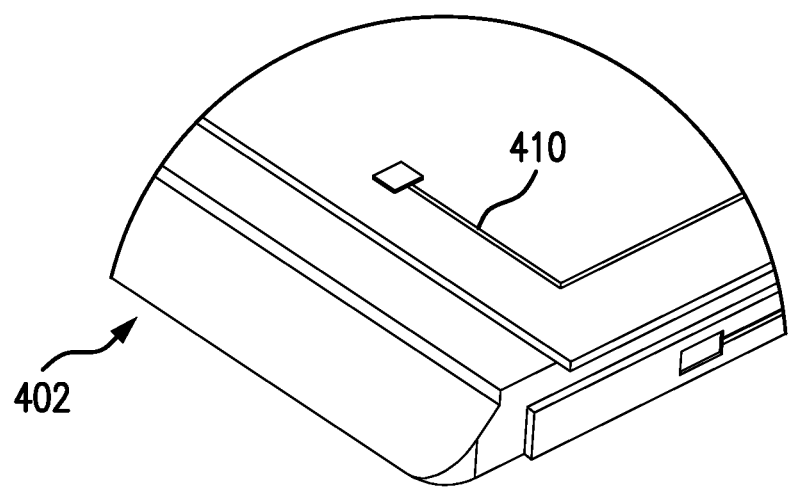
FIG. 28 is a partially transparent isometric view, showing some details of the card holder body, as seen in FIG. 21.

FIG. 28 is a partial isometric view, showing some details of the card holder body 402, in the portion of FIG. 21 indicated by reference numeral 420. A portion of the wiring 410 is visible in FIG. 28. Also, FIG. 28 shows a portion of wiring 422 for monitoring attachment/detachment of the detachable portion 210.

Figure 26:
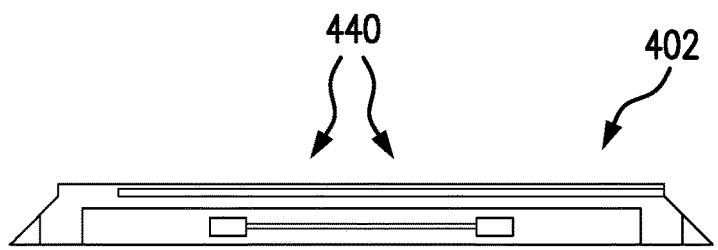
Figure 27:
FIG. 27 is a side elevational view of the card holder body.
Figure 29:
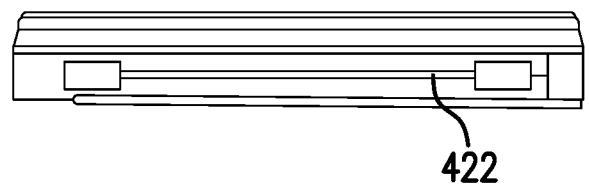
FIG. 29 is a partially transparent end view, showing some details of the card holder body as seen in FIG. 26.

FIG. 29 is a partial elevation view, showing some details of the card holder body 402, in the portion of FIG. 26 indicated by reference numeral 440. The wiring 422 is visible in FIG. 29.

Figure 30:
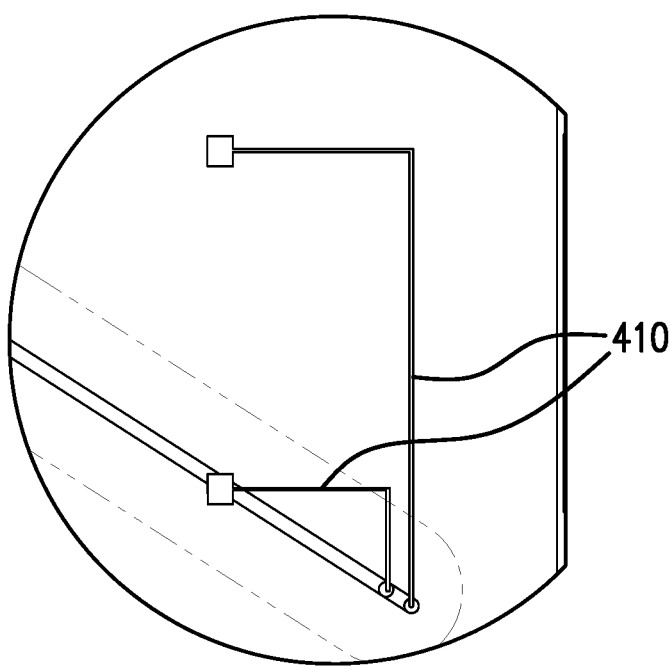
FIG. 30 shows some details of the card holder body as seen in FIG. 24.

FIG. 30 is a partial plan view, showing some details of the card holder body 402, in the portion of FIG. 24 indicated by reference numeral 460. The wiring 410 is visible in FIG. 30.

Figure 31:
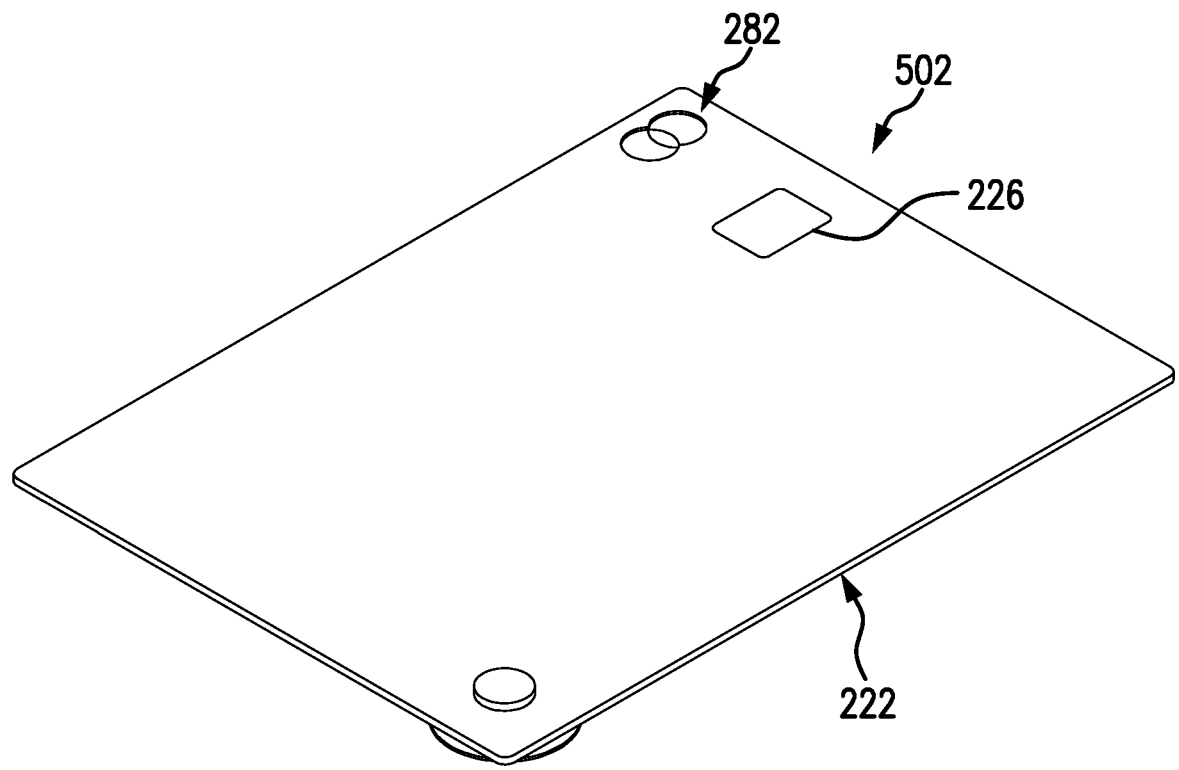
FIG. 31 is an isometric view, taken from above, of a payment card module that is, according to aspects of this disclosure, slidably mounted in the card holder body of FIGS. 21-30.
Figure 32:
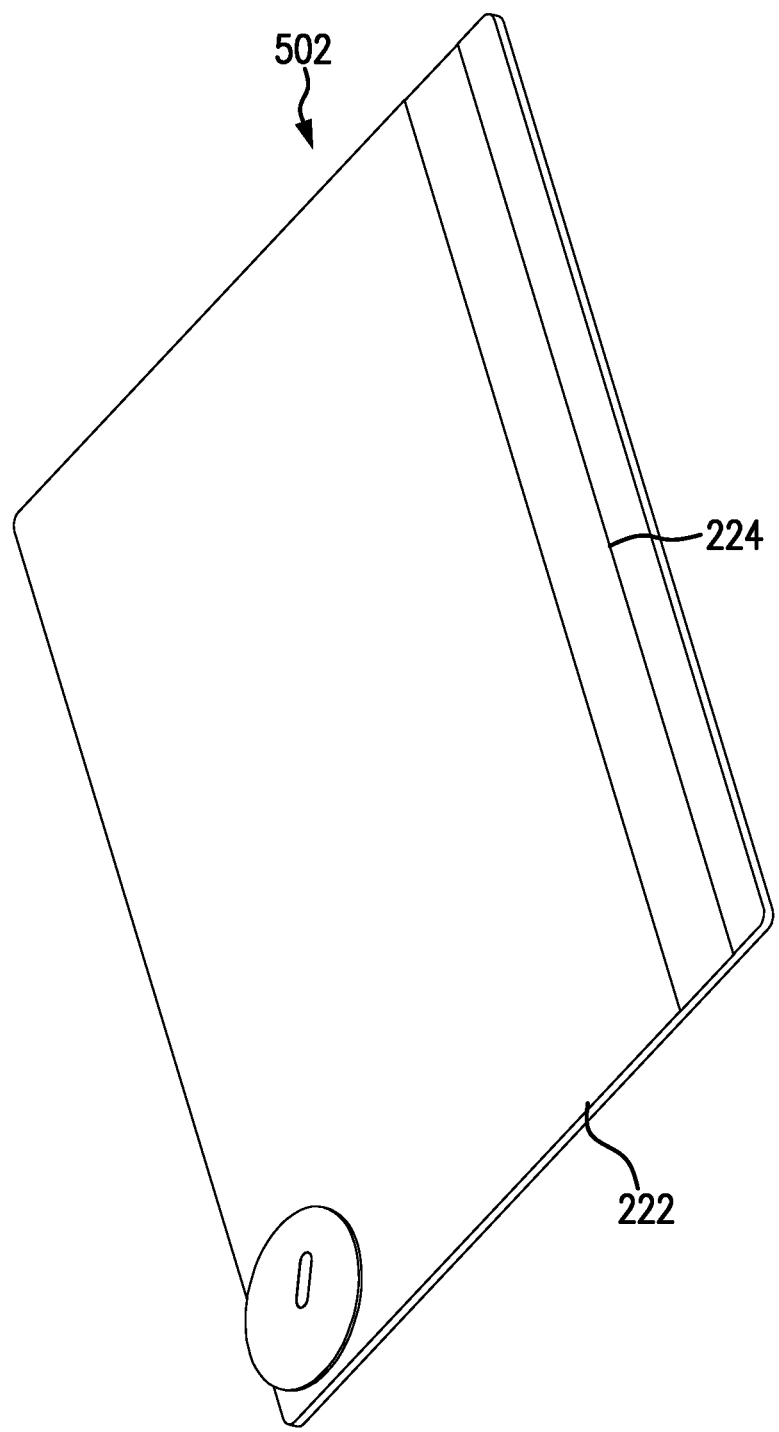
FIG. 32 is an isometric view, taken from below, of the payment card module of FIG. 31.
Figure 33:
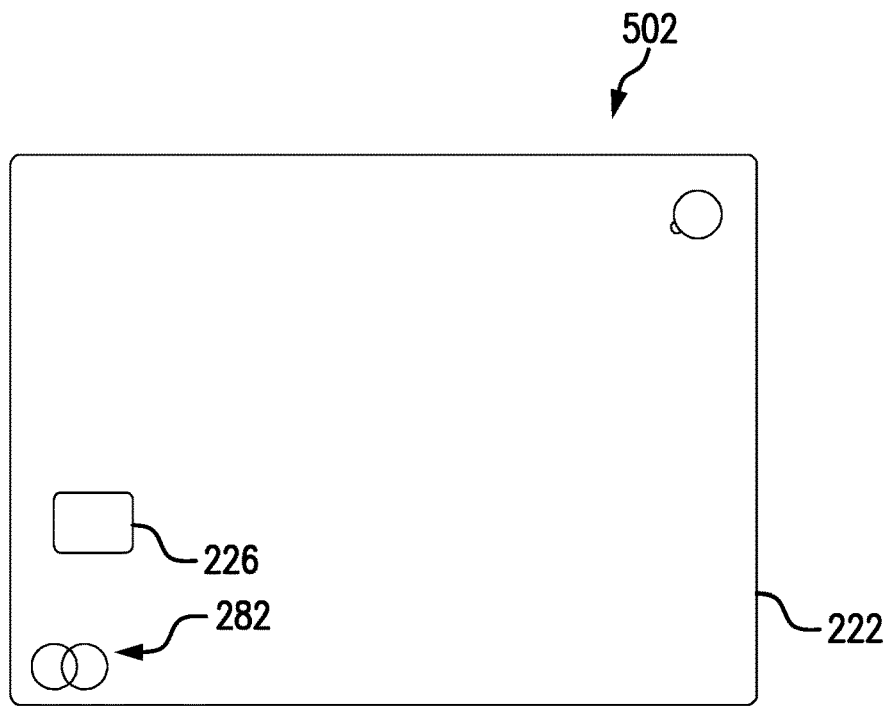
FIG. 33 is a plan view of the payment card module.
Figure 34:
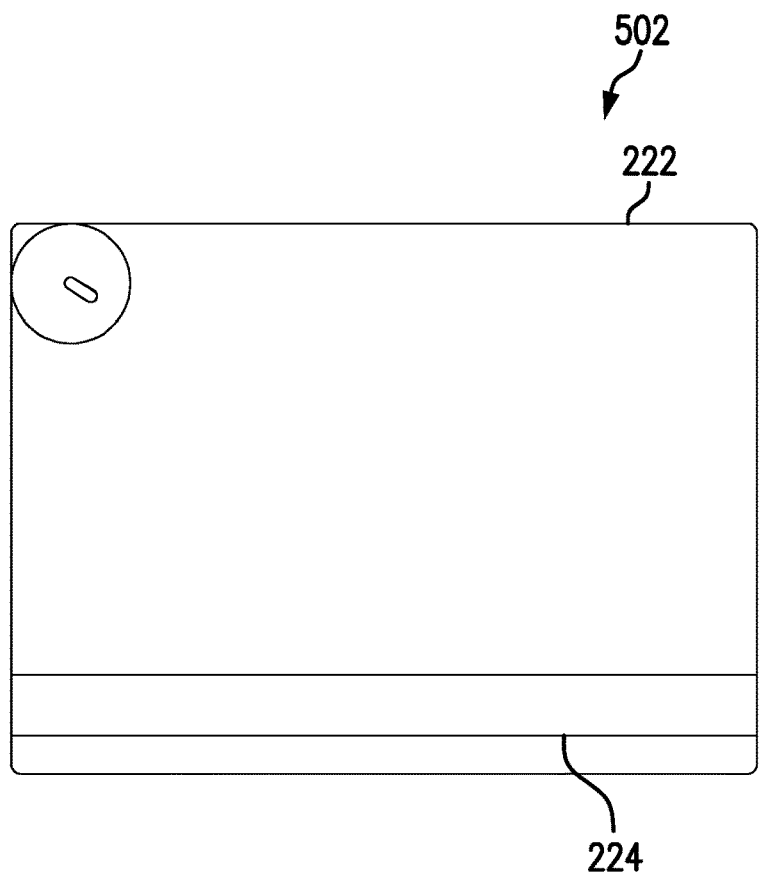
FIG. 34 is a bottom plan view of the payment card module.
Figure 39:
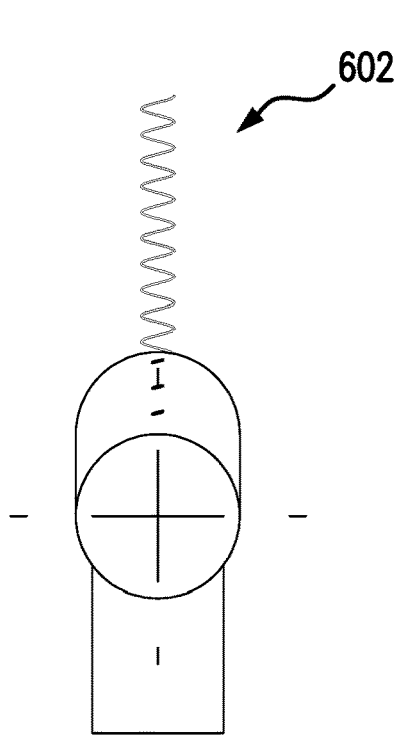
FIG. 39 is a plan view of the card-locking mechanism.
Figure 40:
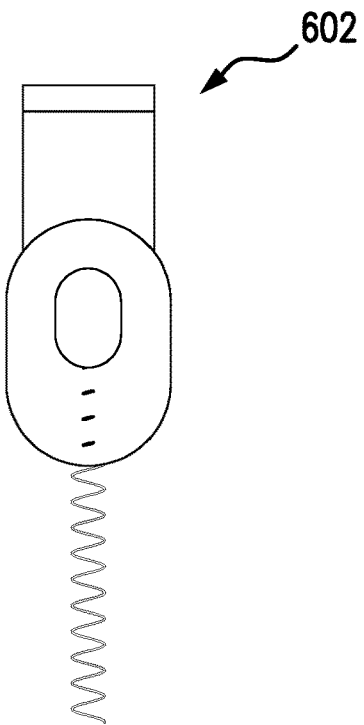
FIG. 40 is a bottom plan view of the card-locking mechanism.
Figure 41:
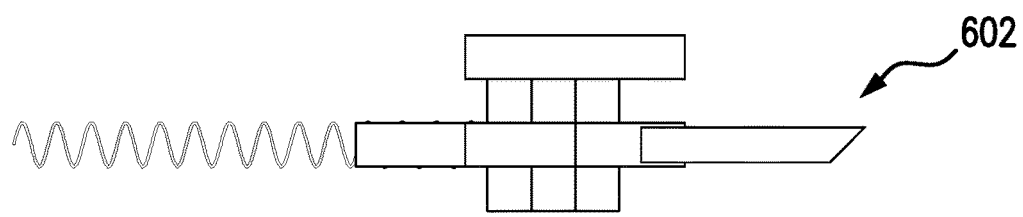
FIG. 41 is a side view of the card-locking mechanism.
Figure 42:
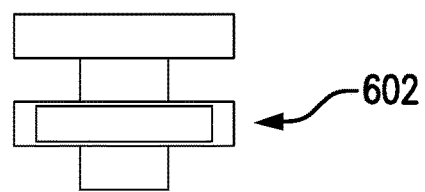
FIG. 42 is an end view of the card-locking mechanism.

FIG. 31 is an isometric view, taken from above, of a payment card module/assembly 502 that is slidably mounted in the card holder body 402 and that includes the above-mentioned payment card 222. FIGS. 32-35 are other views of the payment card module 502, as enumerated above.

FIG. 36 is a partial side view, showing some details of the payment card module 502, in the portion of FIG. 35 indicated by reference numeral 520. As best seen in FIG. 36, the payment card module 502 includes a pin 522 that extends perpendicularly from both the front surface 524 and the back surface 526 of the payment card 222. The pin 522 is for riding in the slot 404 (FIG. 21) in the card holder body 402 to guide sliding motion of the payment card 222.

Continuing to refer to FIG. 36, the payment card module 502 also includes an upper disc member 530 mounted to a top end 532 of the pin 522 at a central point on the bottom surface 533 of the upper disc member 530. The upper disc member 530 has a top surface 534 for being contacted by a user's finger (not shown) to allow the user to impart sliding motion to the payment card module 502. It will be observed that the top surface 534 of the upper disc member 530 is opposite to the bottom surface 533 of the upper disc member 530.

Still further with reference to FIG. 36, the payment card module 502 includes a lower disc member 540 mounted to a bottom end 542 of the pin 522 at a central point on the top surface 543 of the lower disc member 540. The lower disc member 540 has an electrically conductive lower surface 544 that is opposite to the top surface 543 of the lower disc member 540. The conductive lower surface 544 of the lower disc member 540 is for selectively completing a circuit relative to the wiring 410 seen, for example, in FIGS. 30 and 24, to indicate that the payment card 222, by sliding motion, has been moved to an exposed (i.e., actuated) position for executing a payment card transaction at a point of sale.

FIG. 37 is an isometric view, taken from above, of a card-locking mechanism 602 that is included in the mobile telephone case assembly 202. Other views of the card-locking mechanism 602 are provided in FIGS. 38-42, as enumerated in a prior section of this disclosure.

Referring to FIG. 37, the card-locking mechanism 602 includes a lock member 604 and a bias spring 606 that biases the lock member 604 in the direction indicated by arrow mark 608 in FIG. 37. The lock member 604 includes a tongue 620 that extends from the lock member 604 in the direction 608. The lock member 604 also has a button 622 formed integrally therewith at the top of the lock member 604. The button 622 is for being actuated by the user (not shown) in the direction opposite from direction 608 to move the lock member 604 against the biasing force of the bias spring 606 to unlock the card-locking mechanism 602, thereby releasing the detachable portion 210 (FIG. 7) to allow the detachable portion 210 to be detached from the telephone case body 302.

Figure 43:
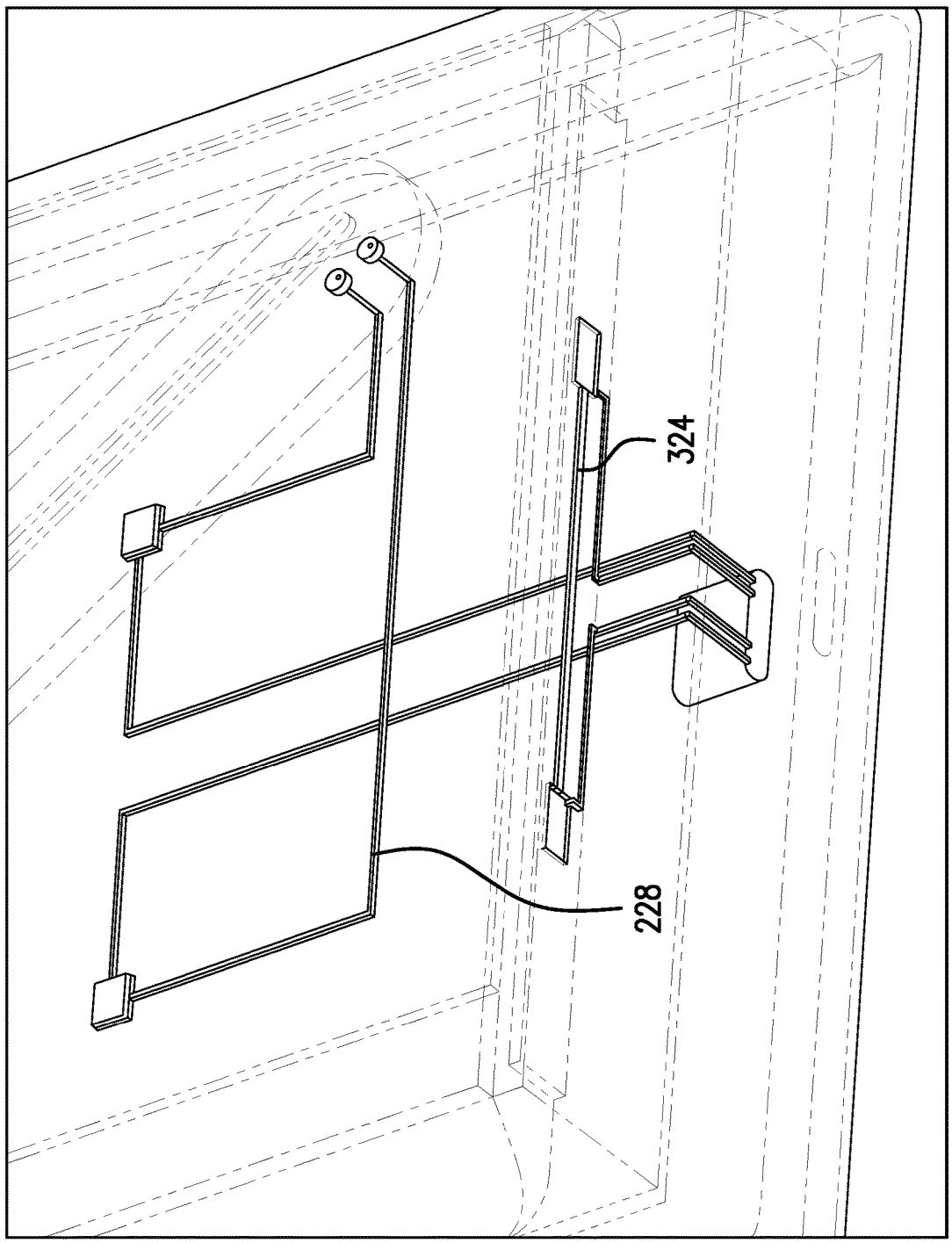
FIGS. 43-45 show details of wiring in the mobile telephone case assembly of FIGS. 3-15.

FIG. 43 is a partially transparent isometric view showing details of the wiring 228 mentioned above. Also seen in FIG. 43 are details of the wiring 324 that was mentioned above. As noted above, the former wiring is for detecting that the payment card 222 has been moved to an exposed position, whereas the latter wiring is for detecting that the detachable portion 210 has been removed from the mobile telephone case assembly 202.

Figure 44:
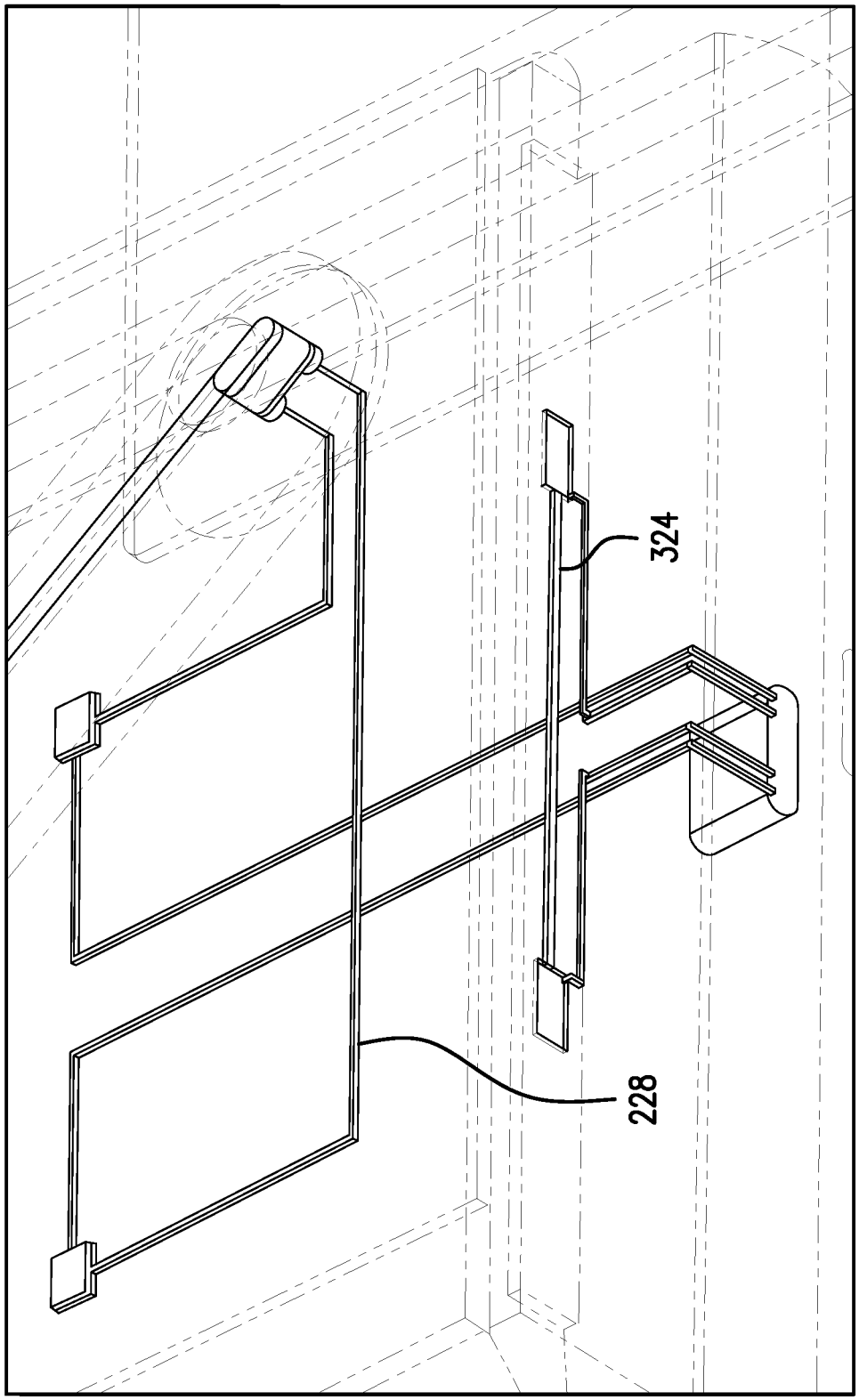

FIG. 44 is another partially transparent isometric view showing details of the wiring 228, 324.

Figure 45:
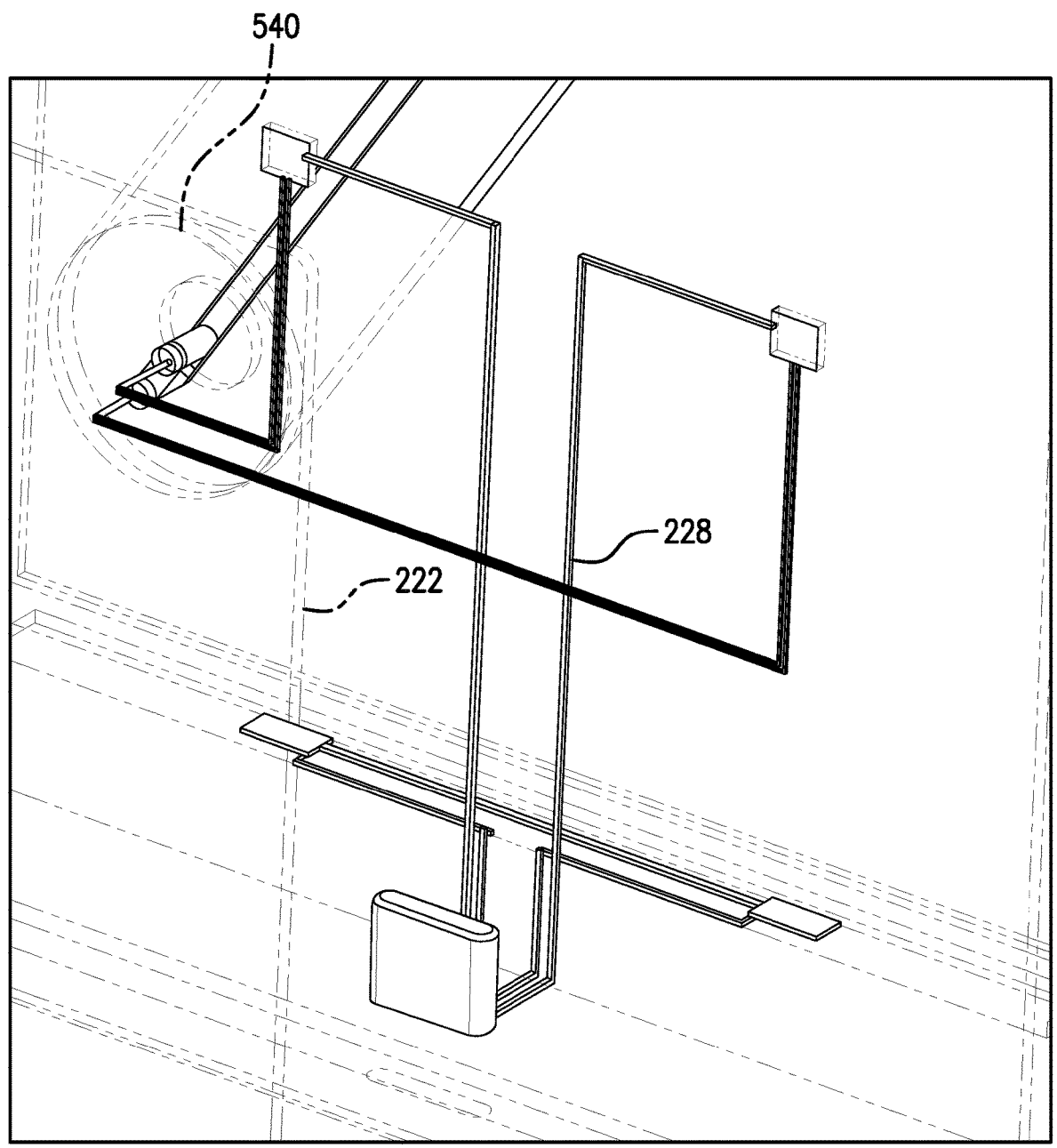

FIG. 45 is still another partially transparent isometric view, showing details of the wiring 228.

Figure 46:
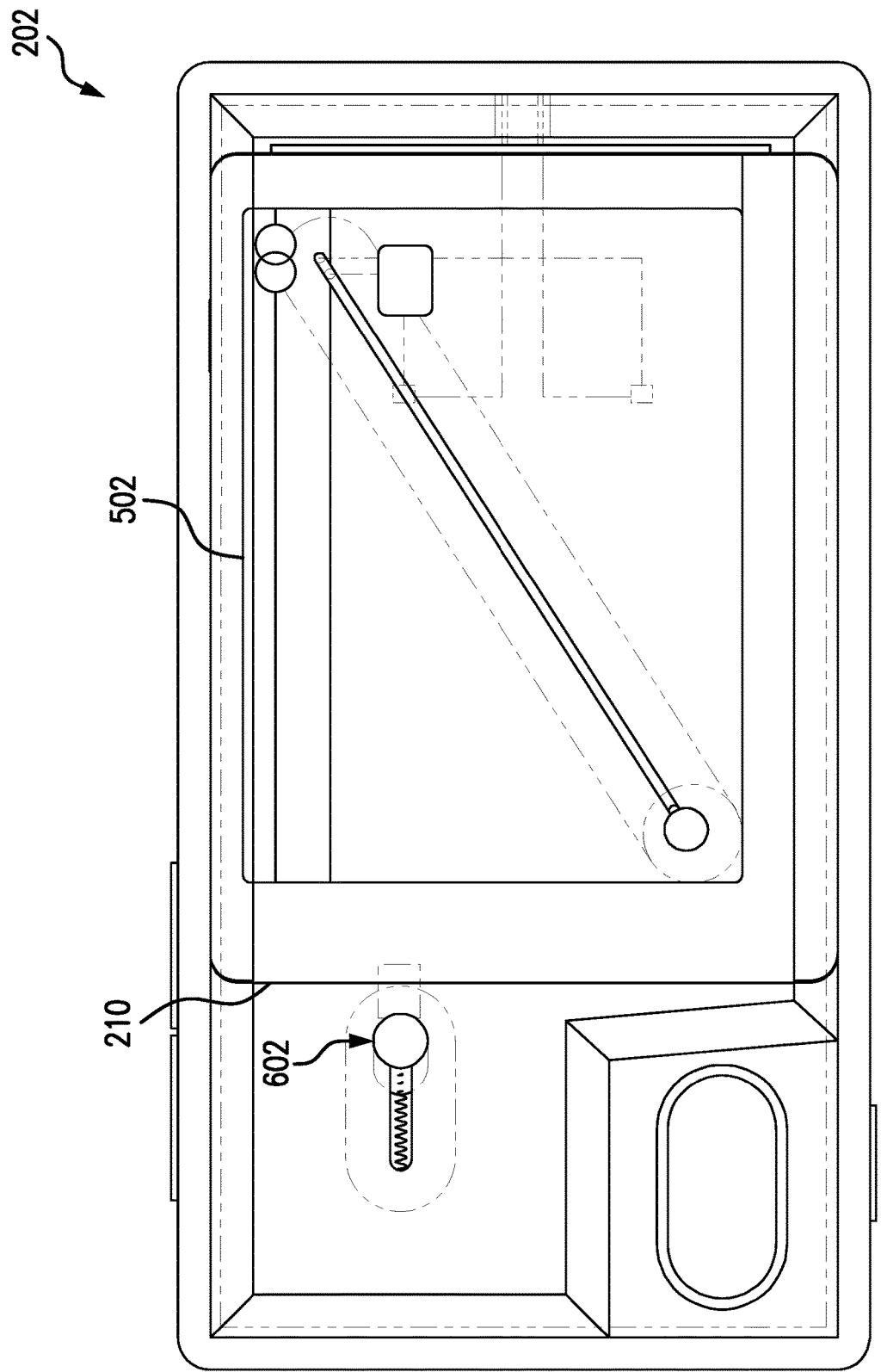
FIG. 46 is a partially transparent bottom plan view of the mobile telephone case assembly, showing the payment card module of FIGS. 31-36 in a housed condition.

FIG. 46 is a partially transparent bottom plan view of the mobile telephone case assembly 202, showing the payment card module 502 in a housed condition (i.e., in a home position). The card-locking mechanism 602 is shown in a locked condition to retain the detachable portion 210 in place as part of the mobile telephone case assembly 202.

Figure 47:
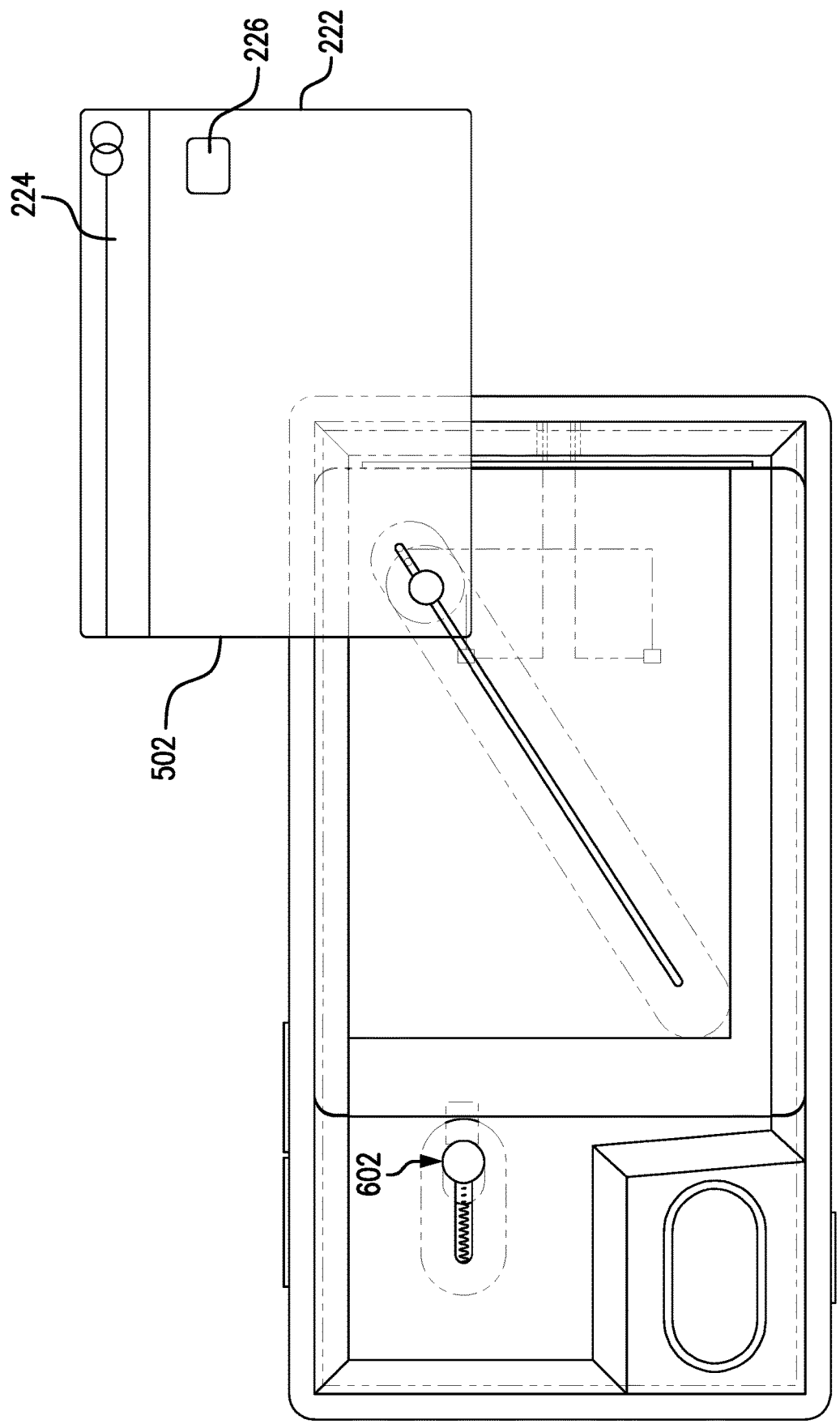
FIG. 47 is a view similar to FIG. 46 but showing the payment card module in an extended condition.

FIG. 47 is a view similar to FIG. 46 but showing the payment card module 502 in an extended condition (i.e., in an actuated position). In the condition illustrated in FIG. 47, much of the payment card 222 extends outside of the mobile telephone case assembly 202, and the magnetic stripe 224 and the contact pad set 226 are both exposed so that the payment card 222 may be used either for a "swipe" transaction or for a contact IC payment card transaction.

Figure 48:
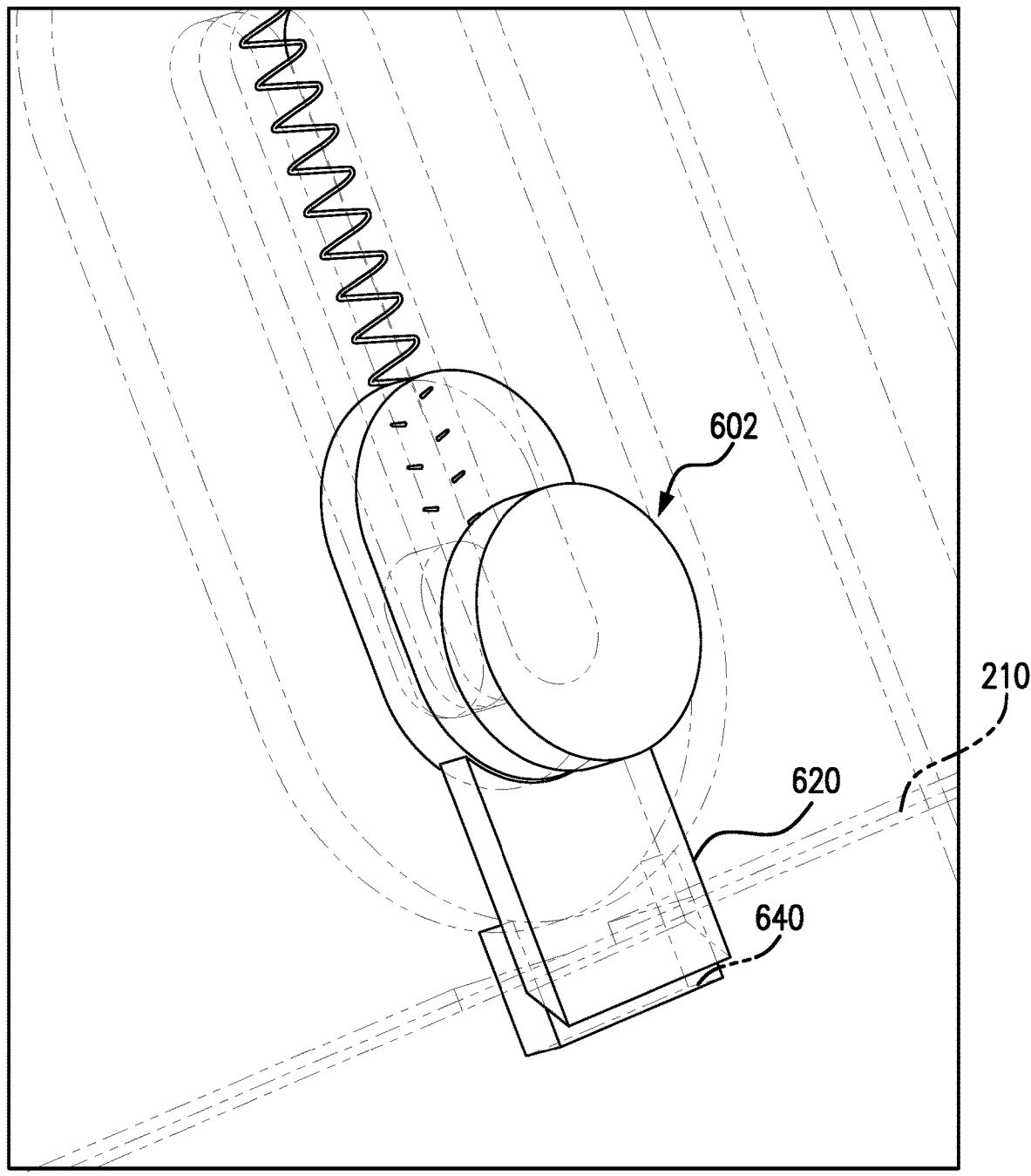
FIG. 48 is a partially transparent isometric view showing the card-locking mechanism of FIGS. 37-42 in a locked condition.

FIG. 48 is a partially transparent isometric view showing the card-locking mechanism 602 in a locked condition, with the tongue 620 extending into a notch 640 in the detachable portion 210 to keep the detachable portion 210 in place.

Figure 49:
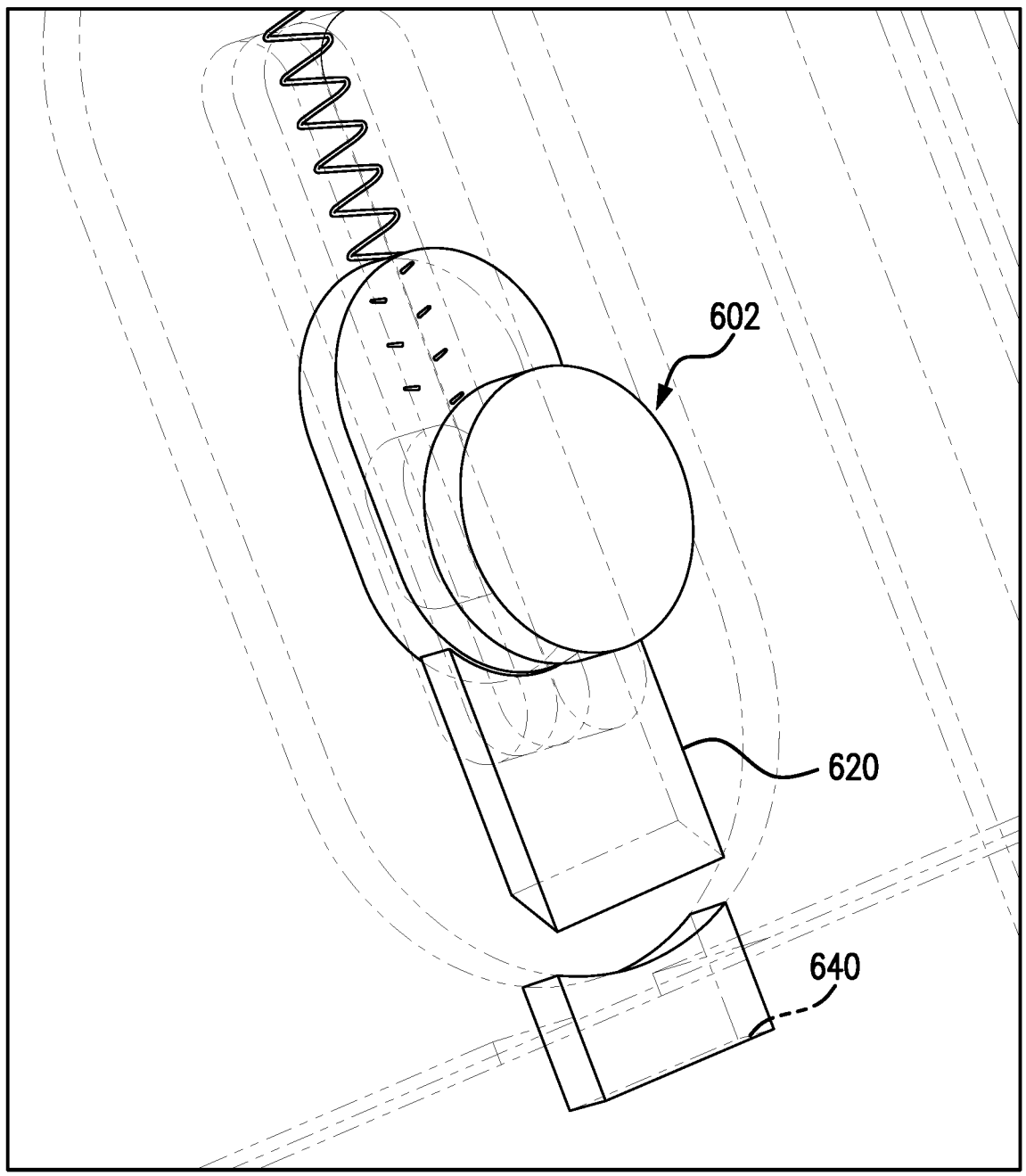
FIG. 49 is a view similar to FIG. 49 but showing the card-locking mechanism in an unlocked condition.

FIG. 49 is a view similar to FIG. 48 but showing the card-locking mechanism 602 in an unlocked condition.

Figure 50:
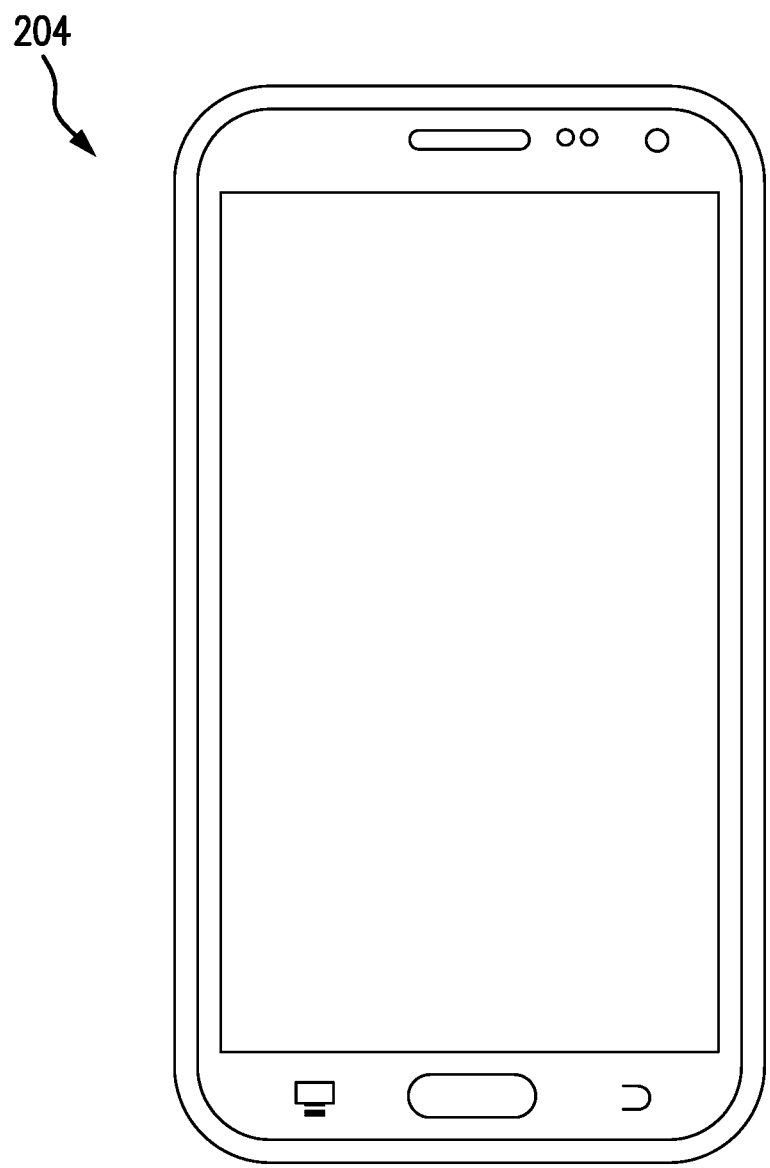
FIG. 50 is a plan view of a typical smartphone that may be held in the mobile telephone case assembly of FIGS. 3-15, the smartphone having features provided according to aspects of the present disclosure.

FIG. 50 is a plan view of a typical example of the smartphone 204 (FIG. 2), as provided in accordance with the teachings of the present disclosure. Details of the smartphone 204 will be discussed below in connection with FIG. 52.

Figure 51:
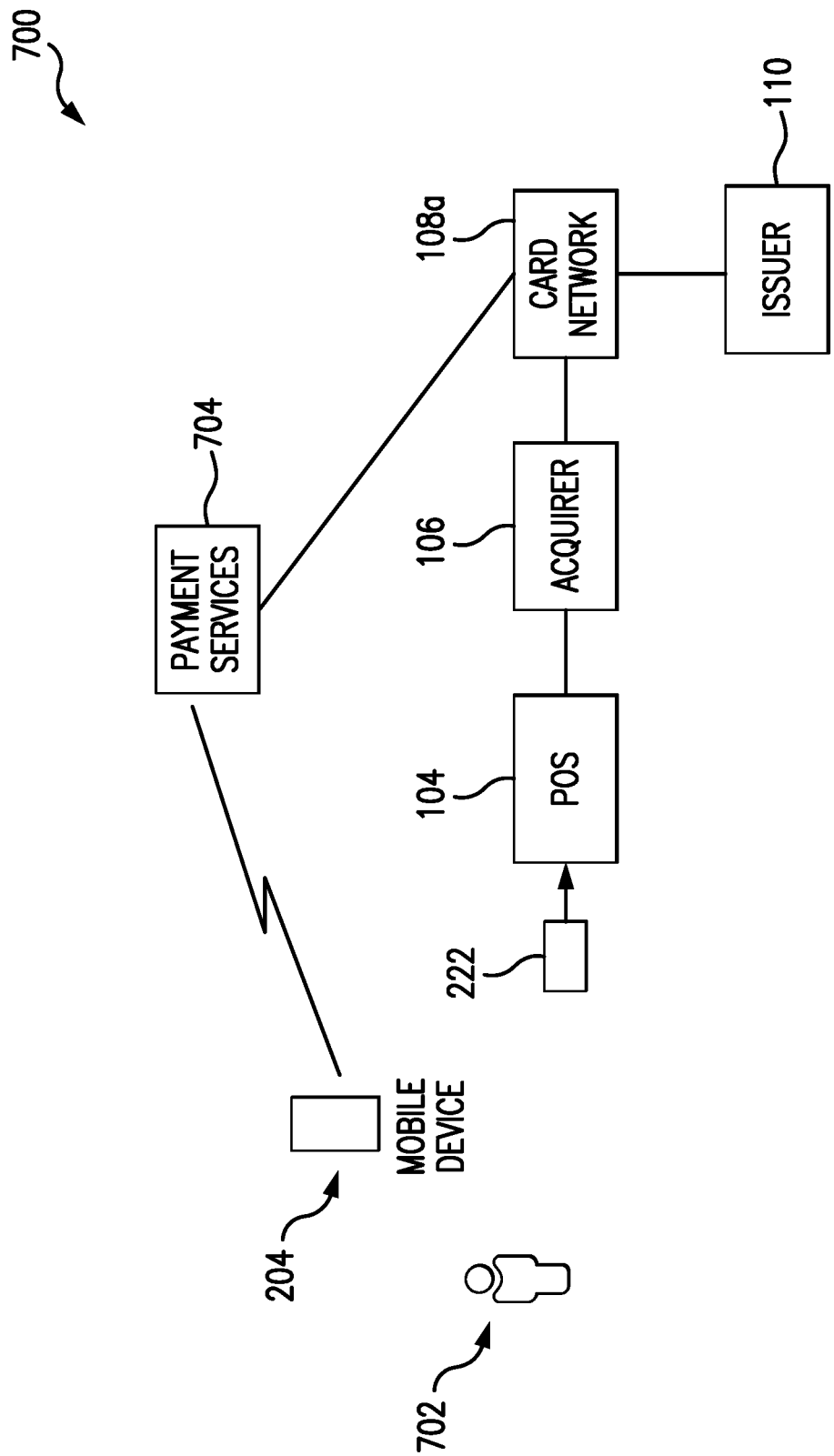
FIG. 51 is a block diagram of a payment system provided according to aspects of the present disclosure.

FIG. 51 is a block diagram of a payment system 700 provided according to aspects of the present disclosure. The payment system 700 may include a similar merchant device 104 (POS device), acquirer 106, card network 108a, and issuer 110 as were discussed in connection with the conventional payment system depicted in FIG. 1. The merchant device 104 is shown reading the above-mentioned payment card 222 (which may be physically connected to the smartphone 204, as illustrated in previous drawings, but not indicated in FIG. 51). It is assumed that the payment card 222 has stored therein a payment token, which the merchant device 104 reads from the payment card 222. The user/cardholder is shown at 702 and may be holding both the smartphone 204 and the payment card 222, although this is not indicated in FIG. 51.

The payment system 700 also includes a payment services computer 704 that is in communication with the smartphone 204 and the card network 108a to aid in detokenizing the payment token in accordance with an account (digital wallet) selection made by the user 702 by operating the smartphone 204. The detokenization occurs after the merchant device 104 has routed a transaction authorization request message via the acquirer 106 to the card network 108a, with the transaction authorization request message including the payment token read from the payment card 222 from the merchant device 104. The issuer 110 is the financial institution that issued the payment account selected by the user 702 by operating the smartphone 204.

Figure 1:
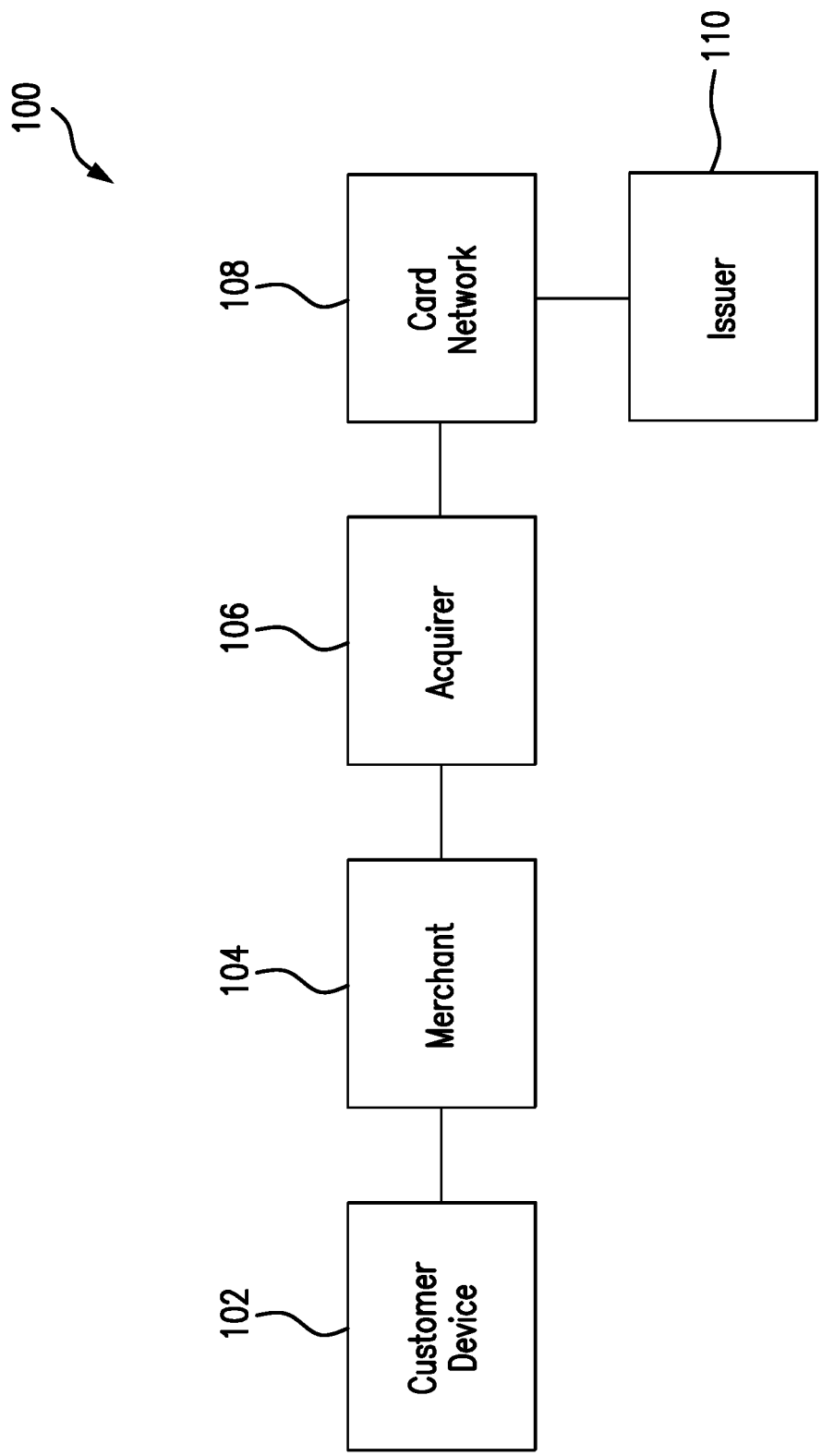
FIG. 1 is a block diagram that shows aspects of a conventional payment account system.

As was the case with the illustration of the payment system in FIG. 1, FIG. 51 only shows entities involved in a single transaction. A practical embodiment of the payment system 700 may handle numerous simultaneous transactions and may include a multiplicity of issuers, acquirers, and merchants, while serving a large population of users.

Figure 52:
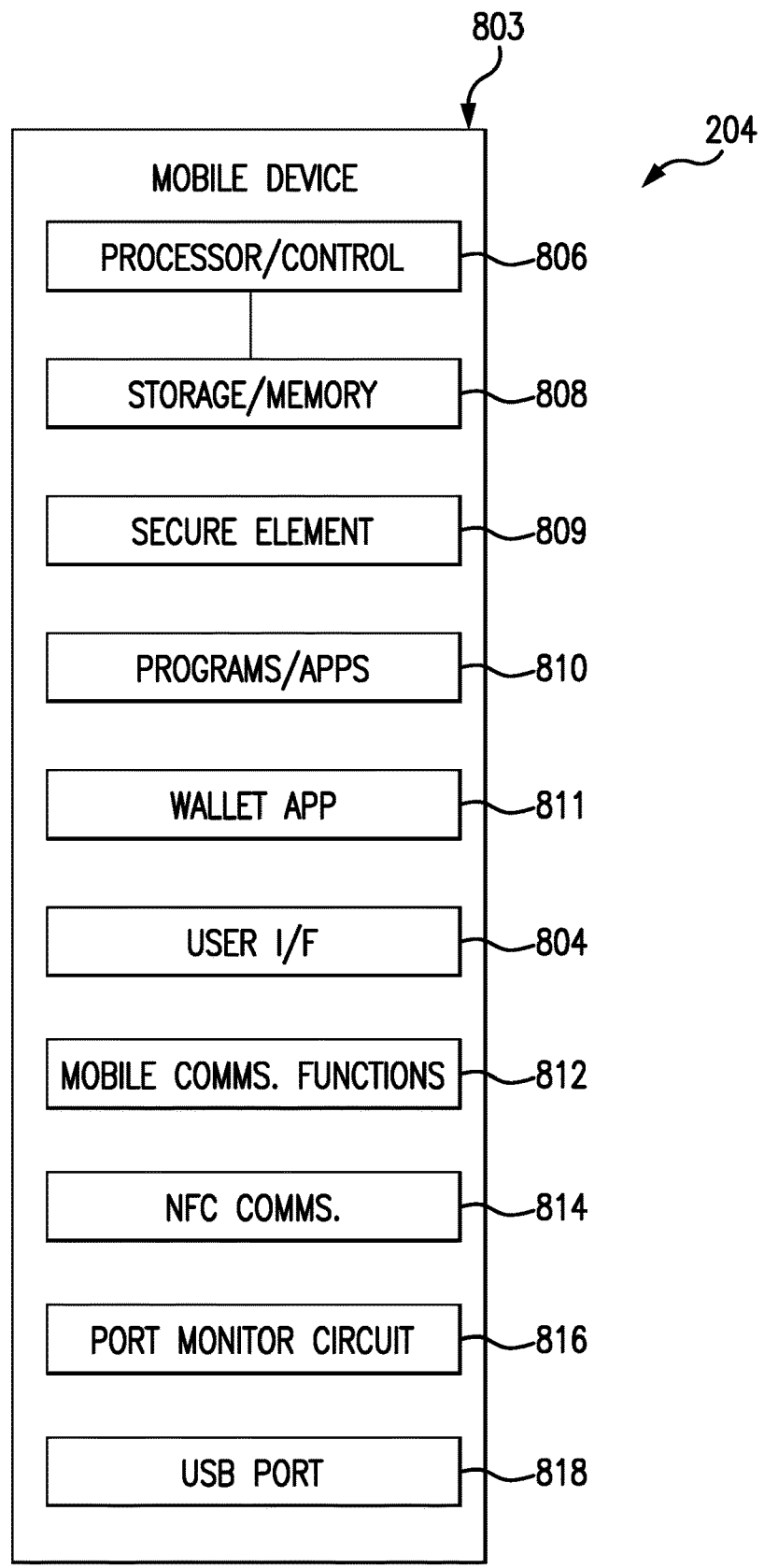
FIG. 52 is a simplified block diagram of the smartphone of FIG. 50, which is also shown in FIG. 51.

FIG. 52 is a simplified block diagram of the smartphone 204.

The smartphone 204 may include a housing 803. In many embodiments, the front of the housing 803 is predominantly constituted by a touchscreen (not separately shown in FIG. 52), which is a key element of the user interface 804 of the smartphone 204.

The smartphone 204 further includes a mobile processor/control circuit 806, which is contained within the housing 803. Also included in the smartphone 204 is a storage/memory device or devices (reference numeral 808). The storage/memory devices 808 are in communication with the processor/control circuit 806 and may contain program instructions to control the processor/control circuit 806 to manage and perform various functions of the smartphone 204. As is well-known, a device such as smartphone 204 may function as what is in effect a pocket-sized personal computer, via programming with a number of application programs, or "apps," as well as a mobile operating system (OS). Also shown as part of the smartphone 204 is a secure element (SE) 809. As is familiar to those who are skilled in the art, the SE 809 may provide enhanced protection from compromise for sensitive data/functionality related to payment operations of the smartphone 204.

The programs/apps that run on the processor/control circuit 806 (and/or on the SE 809) are represented at block 810 in FIG. 52 and may in practice be stored in block 808 (or the SE 809), to program the processor/control circuit 806 (or processing components of the SE 409).

Also shown in FIG. 52 is a wallet app 811. The wallet app 811 is shown apart from the other apps represented at block 810, in part due to the particular relevance of the wallet app 811 to the subject of this disclosure.

In some embodiments, the wallet app 811 may resemble a typical wallet app as previously proposed for or implemented in payment-enabled smartphones. However, the wallet app 811 may also, in accordance with teachings of this disclosure, have further capabilities for detecting and responding to user operation of the movable/detachable aspects of the mobile telephone case assembly 202. Such further capabilities are described in further detail herein, particularly in connection with FIGS. 53 and 54.

As is typical for smartphones, the smartphone 204 may include mobile communications functions as represented by block 812. The mobile communications functions 812 may include voice and data communications via a mobile communication network (not shown) with which the smartphone 204 is registered. The mobile communication functions 812 may be availed of by the smartphone 204 in connection with over-the-air communications between the smartphone 204 and the payment services computer 704, as shown in FIG. 51.

In addition (and continuing to refer to FIG. 52), to facilitate use as a device for contactless payment transactions at the point of sale, the smartphone 204 may include short-range radio communications capabilities (block 814), including for example NFC (near field communication). Thus block 814 may represent a suitable antenna (not separately shown) that is appropriate for NFC communications as well as driving and receiving circuitry associated with the antenna. It will be appreciated that the NFC antenna may be separate and different from the antenna (not separately shown) utilized by the smartphone 204 for the mobile communication functions represented by block 812.

In addition, as represented by block 816, the smartphone 204 may also include a port monitor circuit. The port monitor circuit 816 may detect opening or closing of circuits connected to, e.g., a USB port (block 818) of the smartphone 204 via the plug 242 discussed above and visible for example in FIGS. 3 and 20.

From the foregoing discussion, it will be appreciated that the blocks depicted in FIG. 52 as components of the smartphone 204 may in effect overlap with each other, and/or there may be functional connections among the blocks which are not explicitly shown in the drawing. It may also be assumed that, like a typical smartphone, the smartphone 204 may include a rechargeable battery (not shown) that is contained within the housing 803 and that provides electrical power to the active components of the smartphone 204.

In some embodiments, an SE is not included in the smartphone 204, but security for the payment functionality of the smartphone 204 may be enhanced by known alternatives to an SE, such as a TEE (trusted execution environment).

Figure 53:
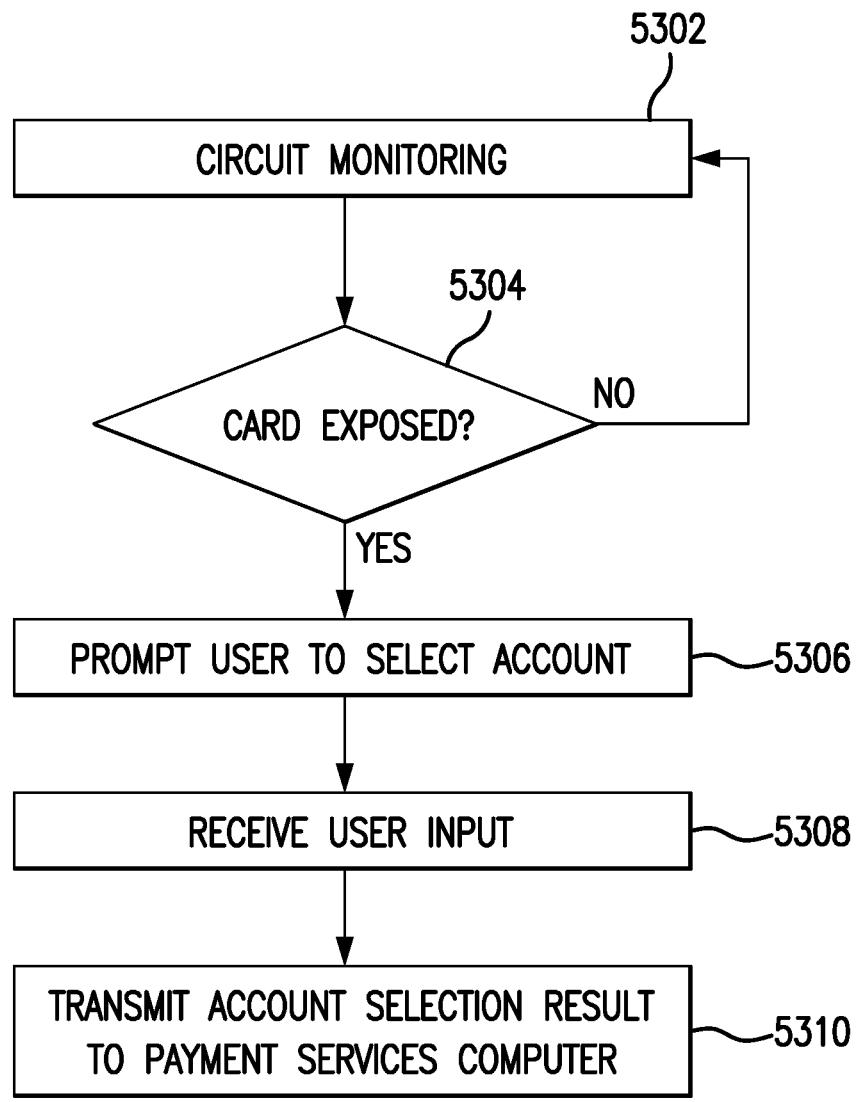
FIGS. 53 and 54 are flow charts that illustrate processes that may be performed by the smartphone of FIGS. 50 and 52 according to aspects of the present disclosure.

FIG. 53 is a flow chart that illustrates a process that may be performed by the smartphone 204 according to aspects of the present disclosure.

At 5302 in FIG. 53, the port monitor circuit 816 (FIG. 52) monitors the above-mentioned circuits connected to the USB port 818. A decision block 5304 may follow block 5302. At 5304, the smartphone 204 determines whether the normally open circuit relating to positioning of the payment card module 502 has been closed, indicating that the payment card module 502 has been moved from its home position shown in FIG. 46 to its actuated position shown in FIG. 47. If such is not the case, then the process of FIG. 53 loops through blocks 5302 and 5304. However, if a positive determination is made at decision block 5304 (i.e., if the smartphone 204 determines that the payment card module 502 has been moved to its actuated position), then block 5306 may follow decision block 5304 in the process of FIG. 53.

At block 5306, and with reference to FIG. 51, the smartphone 204 may prompt the user 702 to provide input to select a payment account for the next transaction in which the payment card 222 is read by a merchant device 104.

At block 5308, the smartphone 204 may receive the requested input from the user 702. That is, the user may select a payment account that has been provisioned to the smartphone 204 and included in a digital wallet held in the smartphone 204.

Block 5310 may follow block 5308 in the process of FIG. 53. At block 5310, the smartphone 204 may communicate an indication of the selected payment account to the payment services computer 704 (FIG. 51). Consequently, via communication between the payment services computer 704 and the card network 108a, the card network 108a may be enabled to detokenize the payment token read from the payment card 222 by the merchant device 104 and included in a transaction authorization request message routed from the merchant device 104 to the card network 108a. As will be appreciated by those who are skilled in the art, the detokenization may result in translation of the payment token into the payment card account number that corresponds to the payment account selected via the digital wallet by the user 702.

Figure 54:
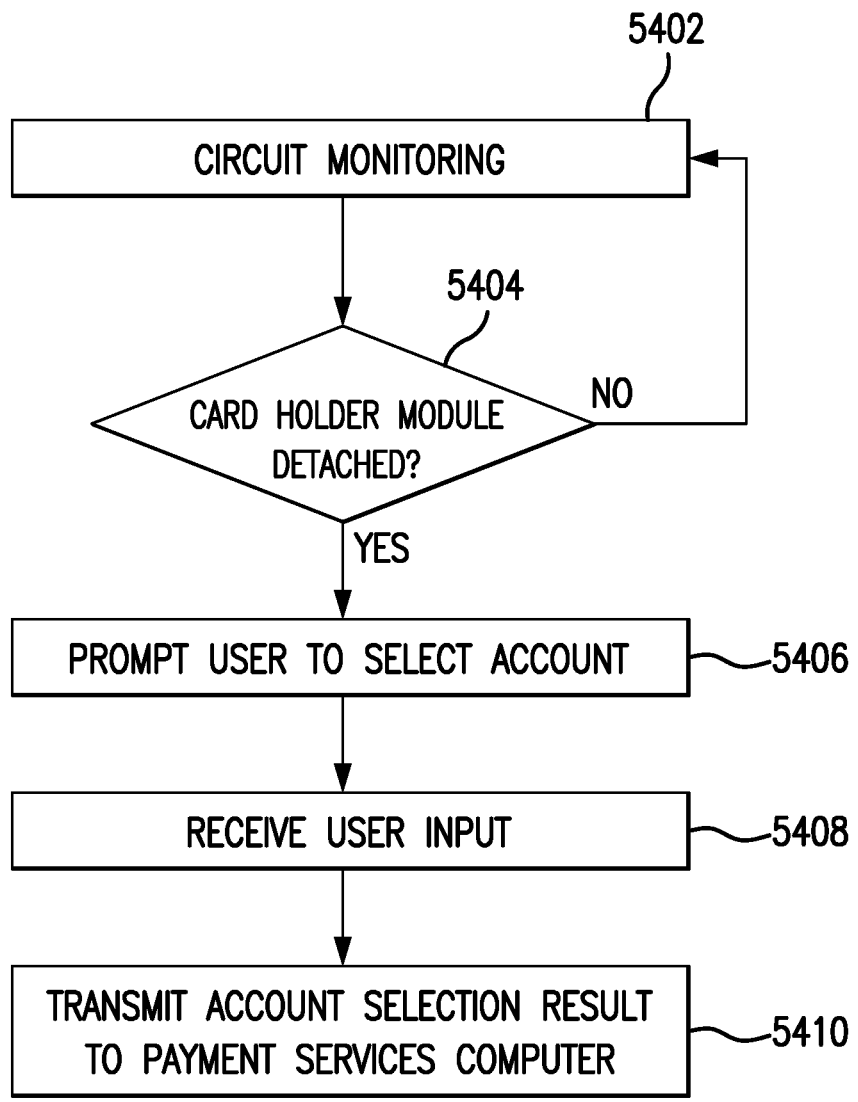

FIG. 54 is a flow chart that illustrates another process that may be performed by the smartphone 204 according to aspects of the present disclosure.

At 5402 in FIG. 54, the port monitor circuit 816 (FIG. 52) monitors the above-mentioned circuits connected to the USB port 818. A decision block 5404 may follow block 5402. At 5404, the smartphone 204 determines whether the normally closed circuit relating to presence of the detachable portion 210 has been opened, indicating that detachable portion 210 has been detached from the mobile telephone case assembly 202. If such is not the case, then the process of FIG. 54 loops through blocks 5402 and 5404. However, if a positive determination is made at decision block 5404 (i.e., if the smartphone 204 determines that the detachable portion 210 has been detached from the mobile telephone case assembly 202), then block 5406 may follow decision block 5404 in the process of FIG. 54.

At block 5406, the smartphone 204 may prompt the user 702 to provide input to select a payment account for the next transaction in which the payment card 222 is read by a merchant device 104. (It is assumed that detachment of the detachable portion 210 presages exposure of the payment card 222 and then reading of the payment card 222 by the merchant device 104.)

At block 5408, the smartphone 204 may receive the requested input from the user 702. That is, the user may select a payment account that has been provisioned to the smartphone 204 and included in a digital wallet held in the smartphone 204.

Block 5410 may follow block 5408 in the process of FIG. 54. At block 5410, the smartphone 204 may communicate an indication of the selected payment account to the payment services computer 704 (FIG. 51). Consequently, via communication between the payment services computer 704 and the card network 108a, the card network 108a may be enabled to detokenize the payment token read from the payment card 222 by the merchant device 104 and included in a transaction authorization request message routed from the merchant device 104 to the card network 108a. As before, the detokenization may result in translation of the payment token into the payment card account number that corresponds to the payment account selected via the digital wallet by the user 702.

With a mobile telephone case assembly as described herein, and with a suitably programmed smartphone held in the mobile telephone case assembly as per FIG. 2, the user may find it highly convenient to "travel light"—that is, the user may carry the phone/case as his/her only means of payment, without encountering difficulty at the vast majority of points of sale that support acceptance of payment card account system transactions. For some transactions (at points of sale that support use of payment-enabled mobile devices), the user may "tap and go," using the smartphone as the payment device. For points of sale that don't support payment-enabled mobile devices, the user may slide the payment card to its actuated position, and then may "swipe and go" or "insert card" for contact IC payment card reading, depending on the configuration of the POS equipment and the preferences of the merchant.

In the situation involving payment for a meal at a sit-down restaurant, when the check is delivered to the user's table, the user may detach the detachable portion of the mobile telephone case assembly, and then slide the payment card to its actuated position, and provide the detachable portion in this condition to the server to settle the check with a payment card account transaction using the payment card.

As noted above, the phone/case combination also allows the user to select an account from a digital wallet maintained in the phone, to enable downstream detokenization of the payment token stored in the payment card. In other embodiments, however, the phone need not be programmed in this manner, and the payment card may store a payment token that is detokenized is due course via a conventional detokenization process without input by the user. Or alternatively, the payment account may store a PAN (primary account number) that does not require detokenization (nor input by the user via the phone).

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

The above descriptions and illustrations of processes herein should not be considered to imply a fixed order for performing the process steps. Rather, the process steps may be performed in any order that is practicable, including simultaneous performance of at least some steps or omission of one or more steps.

As used herein and in the appended claims, the term "payment card system account" includes a credit card account, a deposit account that the account holder may access using a debit card, a prepaid card account, or any other type of account from which payment transactions may be consummated. The terms "payment card system account" and "payment card account" and "payment system account" and "payment account" are used interchangeably herein. The term "payment card account number" includes a number that identifies a payment card system account, or a number carried by a payment card, or a number that is used to route a transaction in a payment system that handles payment card transactions. The term "payment card" includes a credit card, debit card, prepaid card, or other type of payment instrument, whether an actual physical card, electronic, or virtual.

As used herein and in the appended claims, the term "payment card system" or "payment account system" or "payment card account system" refers to a system for handling purchase transactions and related transactions. An example of such a system is the one operated by Mastercard International Incorporated, the assignee of the present disclosure. In some embodiments, the term "payment card system" may be limited to systems in which member financial institutions issue payment card accounts to individuals, businesses and/or other organizations.

Although the present disclosure has been set forth in relation to specific example embodiments, it should be understood that various changes, substitutions, and alterations apparent to those skilled in the art can be made to the disclosed embodiments without departing from the spirit and scope of the disclosure as set forth in the appended claims.

What is claimed is:

1. A mobile telephone case, comprising:
   a case body that defines a pocket that is shaped and sized to hold a mobile telephone; and
   a card holder module attached to said case body;
   said card holder module including a hollow card holder body and an IC payment card slidably mounted within said card holder body, said IC payment card including a front surface and a back surface opposite the front surface; the IC payment card including a set of conductive contacts on the front surface of the IC payment card; said IC payment card slidable between a first position and a second position relative to the card holder body;
   wherein:
      said set of conductive contacts is hidden within said cardholder body when said IC payment card is in said first position; and
      said set of conductive contacts is exposed outside of said card holder body when said IC payment card is in said second position; said IC payment card configured to engage in a contact payment card account transaction via the set of conductive contacts when said IC payment card is in said second position relative to said card holder body, a corner of said IC payment card positioned within said card holder body and mounted thereto when said IC payment card is in said second position relative to said card holder body.

2. The mobile telephone case of claim 1, wherein said IC payment card has a magnetic stripe carried on one of the back surface and the front surface of the IC payment card, said magnetic stripe hidden within said card holder body when said IC payment card is in said first position, said magnetic stripe exposed outside of said card holder body when said IC payment card is in said second position; said IC payment card disposed for engaging in a swipe payment card account transaction via the magnetic stripe when said IC payment card is in said second position relative to said card holder body.

3. The mobile telephone case of claim 1, further comprising wiring in said card holder body for completing an electrical circuit relative to a mobile telephone held in said pocket when said IC payment card is in said second position relative to said card holder body.

4. The mobile telephone case of claim 3, wherein:
   said card holder body has a generally rectangular profile in a plane that corresponds to the IC payment card, said profile having two long sides, said long sides parallel to each other; said profile having two short sides, said short sides parallel to each other and perpendicular to said long sides; said card holder body having a top wall; said top wall having a slot formed therein, said slot extending in a diagonal direction relative to said long and short sides of said profile.

5. The mobile telephone case of claim 4, wherein said IC payment card is part of a payment card module, said payment card module including a pin that extends perpendicularly from both the front surface and the back surface of the IC payment card, said pin located at said corner of said IC payment card, said pin for riding in said slot as the IC payment card slides between said first position and said second position.

6. The mobile telephone case of claim 5, wherein said payment card module further includes an upper disc member mounted to a top end of said pin, said upper disc member contacting said pin at a central point of a bottom surface of said upper disc member, said upper disc member having a top surface for being contacted by a user's finger for imparting sliding motion to said payment card assembly, said top surface of said upper disc member opposite to said bottom surface of said upper disc member.

7. The mobile telephone case of claim 6, wherein said payment card module further includes a lower disc member mounted to a bottom end of said pin, said lower disc member contacting said pin at a central point of a top surface of said lower disc member, said lower disc member having an electrically conductive bottom surface for contacting said wiring in said card holder body for completing said electrical circuit when said IC payment card is in said second position relative to said card holder body.

8. The mobile telephone case of claim 1, wherein said card holder module is detachably attached to said case body.

9. The mobile telephone case of claim 8, wherein:
said case body includes first wiring; and
said card holder module includes second wiring;
said first and second wiring cooperating to complete an electrical circuit relative to a mobile telephone held in said pocket; said circuit being complete when said card holder module is in a home position by being attached to said case body; said circuit being broken when the card holder module is detached from said case body.

10. A method comprising:
carrying a mobile telephone held within a mobile telephone case;
detaching a detachable portion of the mobile telephone case from the mobile telephone case;
detecting, by said mobile telephone, said detaching of the detachable portion of the mobile telephone case; and
in response to said detecting, the mobile telephone prompting a user to select a payment account for use in a payment account system transaction.

11. The method of claim 10, further comprising:
receiving, by the mobile telephone, from the user, an indication of a selected payment account.

12. The method of claim 11, further comprising:
transmitting, by the mobile telephone, to a remote computer, a message that identifies the selected payment account.

13. A method comprising:
carrying a mobile telephone held within a mobile telephone case;
detaching a detachable portion of the mobile telephone case from the mobile telephone case;
detecting, by said mobile telephone, said detaching of the detachable portion of the mobile telephone case; and
prior to said detecting step, monitoring, by the mobile telephone, an electrical circuit that includes a segment incorporated in said detachable portion of the mobile telephone case.

14. The method of claim 13, wherein said detecting includes detecting that the monitored circuit is broken.

15. A method comprising:
carrying a mobile telephone held within a mobile telephone case;
sliding a slidable portion of the mobile telephone case from a first position to a second position;
detecting, by said mobile telephone, that said slidable portion has been moved to said second position; and
in response to said detecting, the mobile telephone prompting a user to select a payment account for use in a payment account system transaction.

16. The method of claim 15, further comprising:
receiving, by the mobile telephone, from the user, an indication of a selected payment account.

17. The method of claim 16, further comprising:
transmitting, by the mobile telephone, to a remote computer, a message that identifies the selected payment account.

18. A method comprising:
carrying a mobile telephone held within a mobile telephone case;
sliding a slidable portion of the mobile telephone case from a first position to a second position;
detecting, by said mobile telephone, that said slidable portion has been moved to said second position; and
prior to said detecting step, monitoring, by the mobile telephone, an electrically conductive lead incorporated in the mobile telephone case;
and wherein said detecting includes detecting that an electrical circuit has been completed, said completed electrical circuit including said monitored electrically conductive lead incorporated in the mobile telephone case.

* * * * *